United States Patent
Hardick et al.

[11] 3,825,988
[45] July 30, 1974

[54] LATCH INSTALLATION MACHINE

[75] Inventors: Aldin Hardick; Delbert House; Alvin M. Martin, all of Muskegon, Mich.

[73] Assignee: Questor Corporation, Toledo, Ohio

[22] Filed: Feb. 21, 1973

[21] Appl. No.: 334,470

Related U.S. Application Data

[62] Division of Ser. No. 153,941, June 17, 1970, Pat. No. 3,742,575.

[52] U.S. Cl............................................. 29/208 R
[51] Int. Cl.......................................... B23p 19/04
[58] Field of Search .......... 29/208 R, 208 F, 208 D, 29/208 C, 222, 261

[56] References Cited
UNITED STATES PATENTS

| | | | |
|---|---|---|---|
| 2,792,625 | 5/1957 | Hoffman............................ | 29/211 X |
| 3,472,521 | 10/1969 | Nisper et al. ....................... | 277/140 |
| 3,742,575 | 7/1973 | Hardick et al..................... | 29/208 F |

*Primary Examiner*—Thomas H. Eager
*Attorney, Agent, or Firm*—Price Heneveld Huizenga & Cooper

[57] ABSTRACT

A pair of adjacent, rotating turrets are indexed to stop at various assembly stations, spaced circumferentially about each turret. Four ring holders are mounted on one turret for holding split rings. Four parts nests are mounted on the other turret for holding lock tabs and latches which are to be inserted into the rings. A ring loader is positioned at one work station adjacent the first turret for loading a piston ring onto a ring holder. Located at work stations adjacent the second turret are a lock tab loader and a latch loader for loading lock tabs and a latch, respectively, into a parts nest. The two turrets then share a common work station at which a ring holder and a parts nest are in alignment. At this point, a lifter pushes the lock tabs and latch out of the parts nest and into engagement with the ring whereby assembly of the ring and latch is facilitated. A ring unloader is located at yet another work station adjacent the first turret for unloading the completed rings. A clearing station is located at a work station adjacent the second turret for clearing the parts nest of any lock tabs and/or latch which might be left in the parts nest as a result of a defective assembly.

38 Claims, 39 Drawing Figures

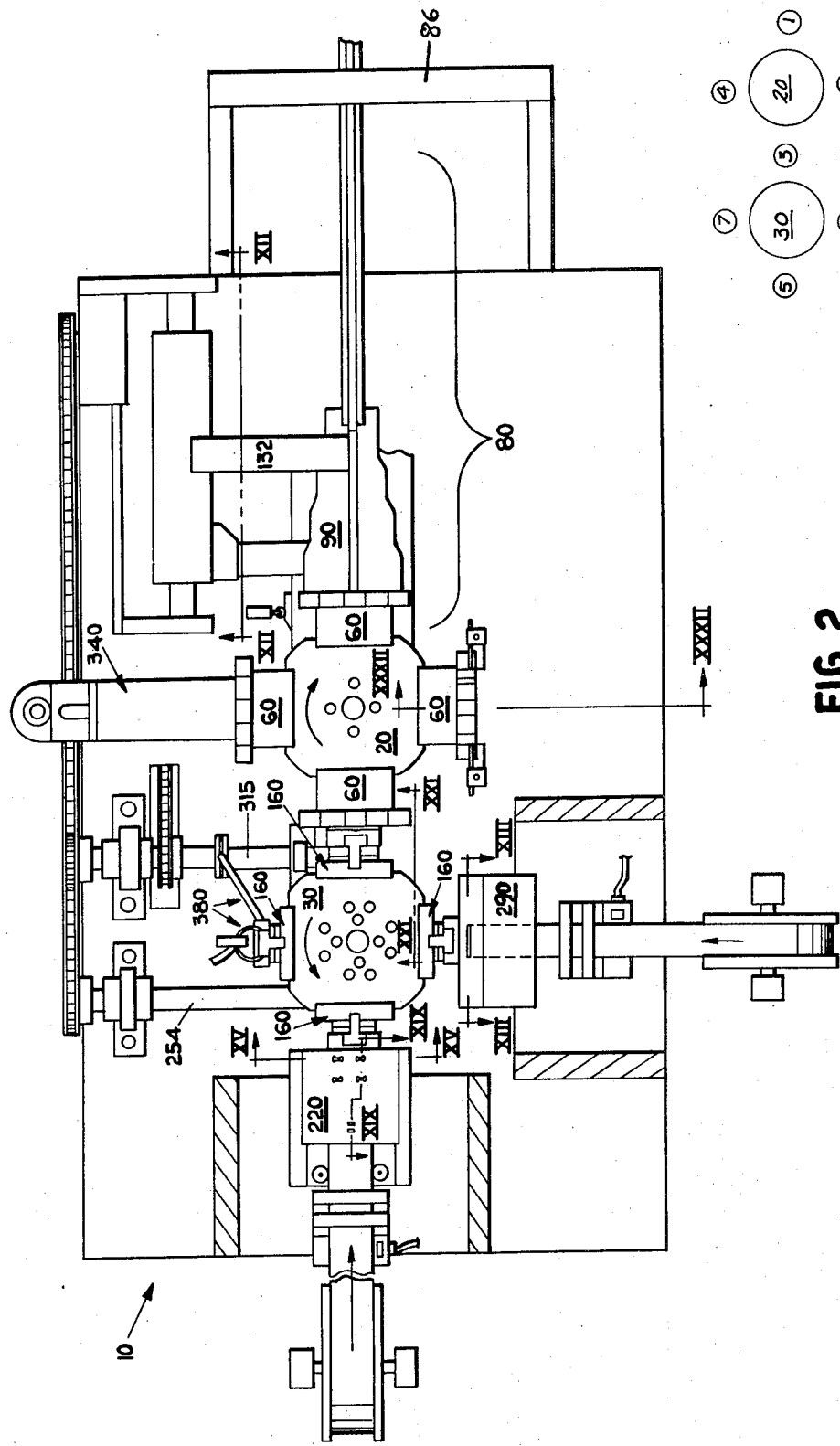

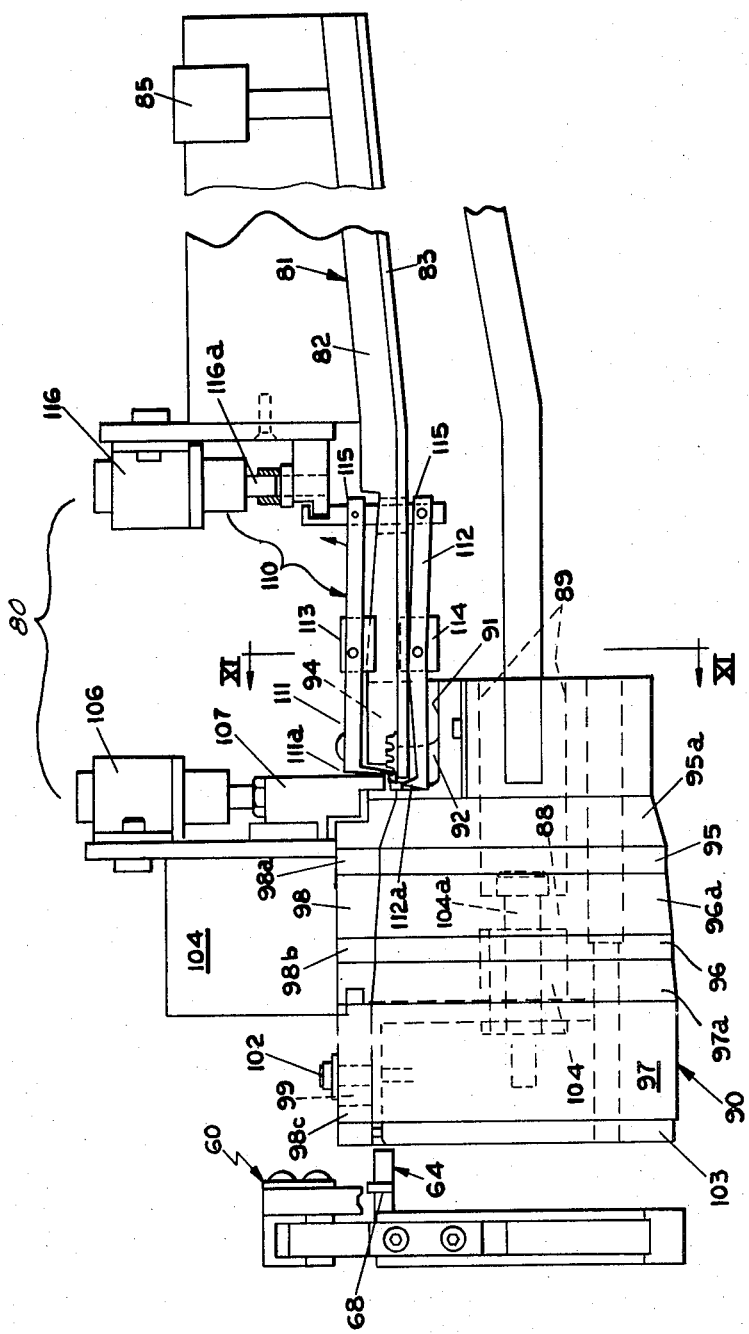

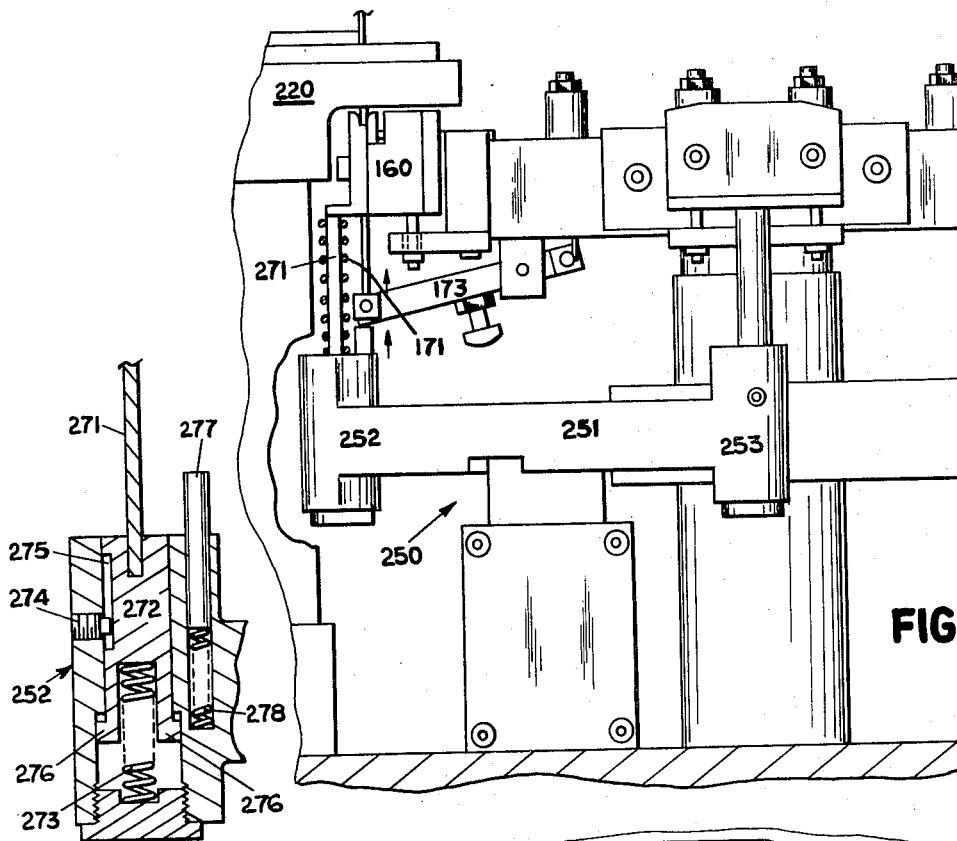
FIG. 24
FIG. 27
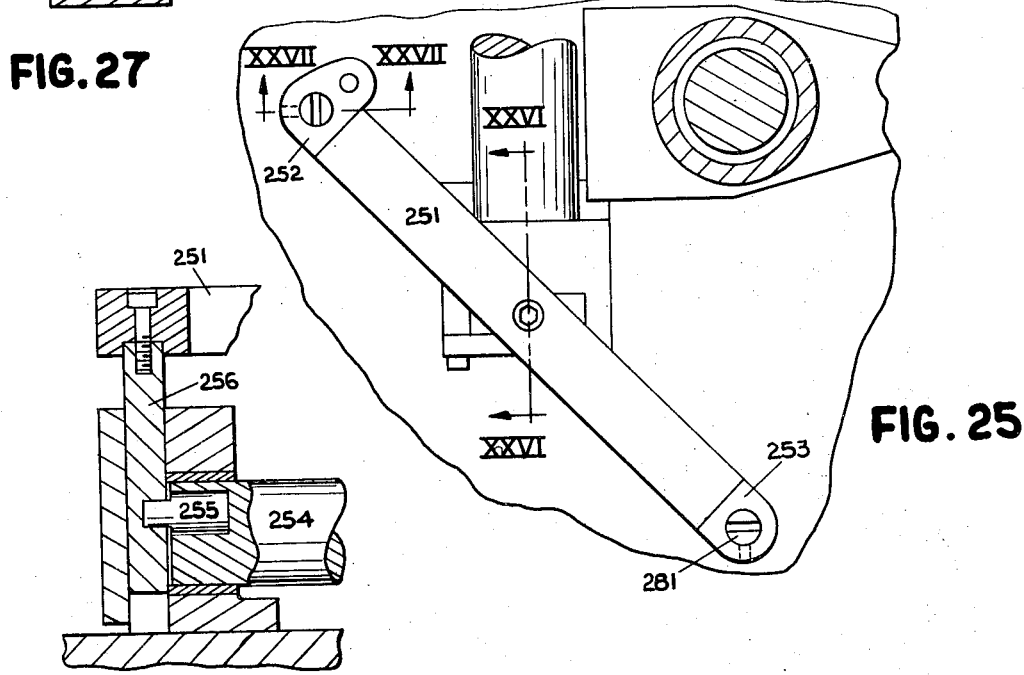
FIG. 25
FIG. 26

3,825,988

LATCH INSTALLATION MACHINE

CROSS REFERENCE TO RELATED APPLICATION

This is a divisional application of parent application Ser. No. 153,941, filed June 17, 1970, now U.S. Pat. No. 3,742,575 and entitled LATCH INSTALLATION MACHINE.

BACKGROUND OF THE INVENTION

This invention relates to an assembly apparatus for placing a gap holding latch across the gap in a split ring. More specifically, it relates to the assembly of spacer-expander piston rings of the type disclosed in U.S. Pat. No. 3,472,521 (K. J. Nisper, et al.) issued Oct. 14, 1969.

Such expander rings serve the function of holding a pair of spaced rails tightly against a piston cylinder wall. The rails then serve to scrape oil off the walls of the cylinder. The spacer-expander ring is of open cross section to allow the drainage of oil back to the crankcase.

In order to function properly, this spacer-expander ring must hold the scraping rails tightly against the cylinder walls. This purpose will be foiled if the spacer-expander is not properly installed in the piston. Improper installation occurs because the ring must, of necessity, have a gap in its circumference in order to facilitate assembly over the piston. It is not uncommon for automotive workers to inadvertently allow the ends of the spacer-expander ring to overlap when assembling it into a piston. If the ends of the spacer-expander ring overlap instead of abut, they will fail to put any tension on the scraper rails. This results in excessive oil burning in the cylinder. Further, there will be a tendency for the overlapping end of the spacer-expander ring to score the cylinder walls.

Because of the location of these spacer-expander rings in the finally assembled engine, it is very difficult to detect such an improperly installed spacer-expander ring in an assembled engine. Consequently, such improperly installed rings are a common cause of unacceptable oil consumption in new cars.

In order to overcome such improper installation, a spacer-expander ring has been developed with a latch 12 extending across the open gap in the ring 18 (FIG. 38). This latch makes it impossible to install the ring with the ends overlapping. This ring is disclosed and claimed in U.S. Pat. No. 3,472,521 cited supra page 1. Basically, it comprises a latch 12 which is slidably held in place in the ring by means of a pair of lock tabs 15, one being located on either side of the gap in the ring.

One problem encountered with such rings is that they are extremely costly to manufacture. In the past, they could be assembled only by hand. This work is extremely tedious and results in a costly product.

SUMMARY OF THE INVENTION

The present invention comprises an apparatus whereby such rings can be automatically assembled. The apparatus includes means for holding a ring and means for automatically loading the ring onto the ring holding means. Similarly, means are provided for holding a latch and for automatically loading the latch onto the latch holding means. The latch and ring are then assembled together by a means for aligning the latch holding means and the ring holding means and by a means for forcing the latch into engagement with the ring.

In the preferred embodiment, means are also provided for loading lock tabs onto the latch holding means. However, this is not necessarily essential to the invention since it may be possible to design a ring and latch which do not have to utilize lock tabs for holding the latch in the ring.

In another aspect of this invention, the ring holding means and latch holding means are each mounted on a separate rotatable turret positioned adjacent one another. Means for indexing the rotation of the turrets cause the ring holding means and the latch holding means to stop at various work stations spaced circumferentially about each of the turrets. Thus, at one work station positioned adjacent the first turret, the means for loading rings would act to load a ring onto the ring holding means. Similarly, a means positioned at a second work station adjacent the second turret would load a latch onto the latch holding means. The first and second turrets then share a third and common work station at which the ring holding means and the latch holding means come into alignment. Means for pushing the latch out of the latch holding means into engagement with the ring then effectuates a final assembly of the ring.

In order to facilitate a proper insertion of the latch into the ring, means are provided for maintaining a predetermined gap in the ring which is placed on the ring holding means. The latch holding means includes a pusher for pushing the latch out of the latch holding means when activated. When the latch holding means and the ring holding means are aligned, a means for activating the pusher causes the latch to be pushed into engagement with the ring, across the predetermined gap.

Yet another object of the invention is to provide means for positive control of component parts at all times. Thus, for example, one of the parts loading devices utilizes a punch which drives a part downwardly through a passageway while the pusher described above comes up to meet it. The part is held between the pusher and punch until both part and pusher are driven down into the parts holder.

In another aspect of the invention the ring loading means includes a means for expanding the ring to create a gap which is about the same as or greater than the gap maintained by the gap maintaining means on the ring holding means. Means are provided for moving the expanded ring into engagement with the ring holding means.

Thus, the various related concepts encompassed by this invention are directed towards various phases of automation of an operation which heretofore has been accomplished only by hand. These and other objects and advantages of the invention will become apparent through reference to the written specification and appended drawings.

BRIEF DESCRIPTION OF THE DRAWINGS

FIG. 1 is a schematic plan view of the arrangement of turrets and various work stations;

FIG. 2 is a plan view of the latch installation apparatus;

FIG. 8 is a sectional view taken along plane VIII—VIII of FIG. 7, showing the ring loader in its aft position;

FIG. 24 is a side elevation of the loader-lifter assembly;

FIG. 25 is a plan view of the loader-lifter assembly;

FIG. 26 is a cross section taken along plane XXVI—XXVI of FIG. 25;

FIG. 27 is a cross section taken along plane XXVII—XXVII of FIG. 25;

PREFERRED EMBODIMENT

Figure 38:
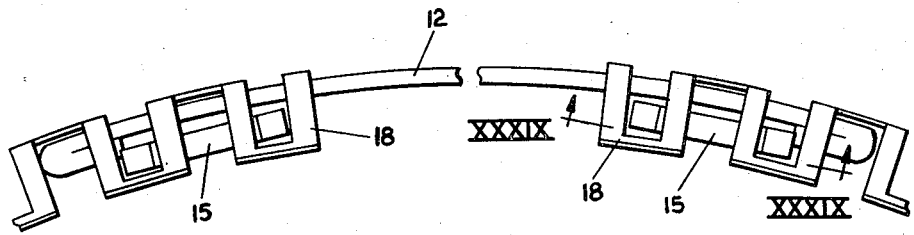
FIG. 38 is a side elevational view of the gapped or split end of a ring, including its latch and latch lock tabs.

The purpose of latch installation machine 10 (FIG. 2) is to assemble a latch 12 and latch lock tabs 15 into a spacer ring 18 (FIG. 38). In order to accomplish this end, the various components are loaded onto appropriate parts holding devices, moved into alignment and then automatically assembled.

The components are moved from place to place by a pair of rotatable turrets, a ring turret 20 and a parts turret 30, which are mounted adjacent to one another (FIGS. 1 and 2). Mounted on ring turret 20 are four ring holders 60, each for holding a ring 18. Mounted on parts turret 30 are four parts nests 160, for holding the latches and the lock tabs. Rotation of ring turret 20 and parts turret 30 is indexed, such that the ring holders 60 and latch holders 160 are brought to a stop in alignment with various assembly stations spaced circumferentially about each turret (FIG. 1). Various assembly components are positioned at these work stations for loading parts onto a ring holder 60 and parts nest 160, for effecting assembly of the components and for removing the assembled spacer ring and latch.

Located at work station 1 (FIG. 1), adjacent ring turret 20, is a ring loader 80 (FIG. 2) which loads a ring 18 onto one of the ring holders 60. At the same time, a lock tab loader 220 (FIG. 2), located at work station 5 (FIG. 1) adjacent parts turret 30, loads a pair of lock tabs 15 into parts nest 160. Turret drive 40 (FIG. 3) then rotates ring turret 20 and parts turret 30 through 90°, such that the loaded ring holder 60 is positioned in alignement with work station 2 (FIG. 1) and the previously loaded parts nest 160 is located in alignment with work station 6.

No assembly component is located at work station 2. However, a latch loader 290 (FIG. 2) is positioned at work station 6 (FIG. 1) for loading a latch into parts nest 160. With this accomplished, turret drive 40 again rotates the two turrets through 90° such that the particular ring holder 60 and parts nest 160 under discussion now come into alignment with work station 3 (FIG. 1). Work station 3 is the assembly station and is common to both ring turret 20 and parts turret 30. At work station 3, the ring holder 60 and parts nest 160 are in alignment with one another. At this point, assembly lifter 310 is activated and acts in conjunction with pushers 171 in parts nest 160 to drive latch 12 and lock tabs 15 upwardly into engagement with ring 18, to thereby effectuate an assembly of the completed latched ring 11 (FIG. 38).

With assembly thus effected, both turrets are again rotated 90° by turret drive 40 and a ring unloader 340, positioned at work station 4, unloads the assembled, latched ring 11 from ring holder 60. Ring holder 60 is now empty and can again be loaded when it is rotated into alignment with work station 1.

Once assembly is effected at work station 3, parts nest 160 should also be empty. However, there always exists the possibility of an aborted assembly with the result that a latch 12 and/or one or both lock tabs 15 might remain in parts nest 160. To insure removal of such parts, a clearing apparatus 380 is positioned at work station 7 (FIG. 1), adjacent parts turret 30, to clear parts nest 160 of any parts remaining therein.

Upon rotation of the turrets another 90°, the above cycle is again repeated with the same parts nest 160 and ring holder 60. Because there are four such parts nests 160 and four such ring holders 60 positioned about parts turret 30 and ring turret 20, respectively, there are four assembly cycles proceeding simultaneously. Thus, with each 90° rotation of ring turret 20 and parts turret 30, all of the assembly components are activated simultaneously. This includes ring loader 80, lock tab loader 220, latch loader 290, assembly lifter 310, ring unloader 340 and clearing apparatus 380.

With the general operation of the apparatus now understood, the specific components thereof will now be discussed individually.

TURRETS AND TURRET DRIVE

Figure 3:
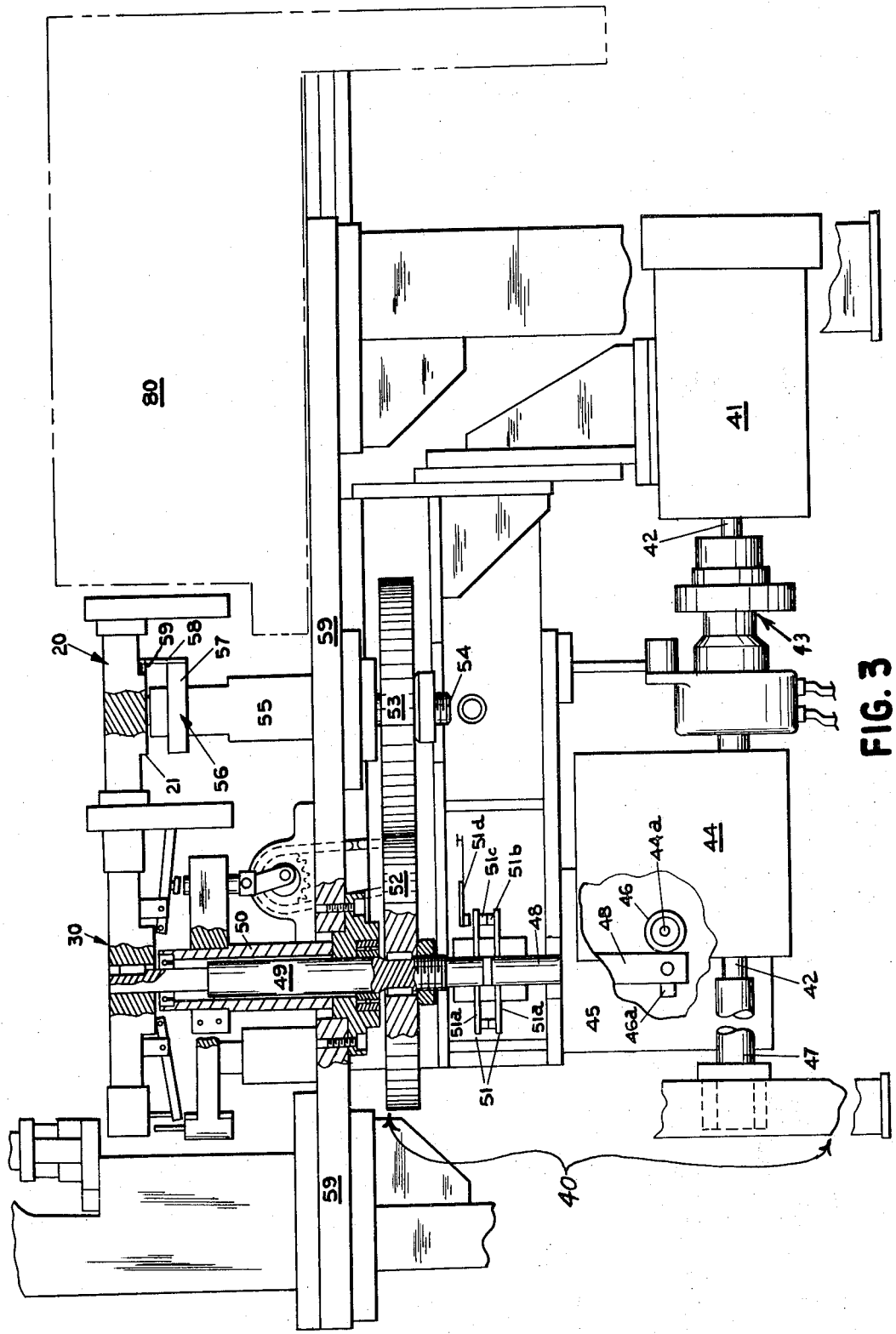
FIG. 3 is a rear elevational view of the latch installation apparatus.

Ring turret 20 and parts turret 30 are driven by an elaborate turret drive 40 (FIG. 3). The prime mover of turret drive 40 is a DC motor 41 having a motor output shaft 42. Motor output shaft 42 is connected to a gear reducer 44 through a clutch brake assembly 43. Gear reducer 44 drives an indexing drive system 45.

Indexing drives are well-known in the art, and indexing drive 45 can be a conventional indexing drive train which will index the rotation of the shaft for 90° of rotation followed by a dwell time prior to subsequent rotation. One indexing drive which has been found suitable can be purchased from Ferguson Machine Company and bears their general designation of 8/2FM75-120.

The principle of indexing drives 45 is illustrated schematically in the cut-away portion of FIG. 3. Thus, an output shaft 44a of gear reducer 44 drives a cylindrical cam 46. The track of cam 46 is open at each end such that it can pick up a follower 46a mounted on a vertical output shaft 48, carry follower 46a through a rotational period and a dwell time, and then discharge it out the other open end of the track and pick up yet another follower 46a. Since there are four work stations about each of the turrets 20 and 30, there are four such cam followers 46a on vertical output shaft 48.

Vertical output shaft 48 is connected to parts turret shaft 49 through a torque limiter 51. Torque limiter 51 operates on conventional principles, and comprises a pair of spaced plates 51a, one connected to vertical output shaft 48 and the other connected to parts turret drive shaft 49. The spaced plates 51a are operably connected through an interacting wedge 51b and slide 51c. A plurality of wedges 51b are mounted on the lower plate 51a while a plurality of slides 51c are mounted on the upper plate 51a. As long as parts turret drive shaft 49 does not meet with any resistance, it will be rotated by vertical output shaft 48 through the interaction of wedges 51b with slides 51c. However, as soon as any resistance is applied to shaft 49, as, for example when parts turret 30 or ring turret 20 becomes jammed for some reason, output shaft 48 will continue to rotate while parts turret drive shaft 49 will stop rotating. Consequently, it will ride upwardly because of the action of slide 51c sliding on wedge 51b. As it does, it will eventually come into contact with a ground contact 51d which sends a signal to brake clutch 43 ordering it to disengage and thereby brake the drive train from motor 41.

Parts turret 30 is secured directly to the top of parts turret drive shaft 49, the latter being journaled in a cylindrical housing 50. The rotation of parts turret drive shaft 49 is transferred to ring turret drive shaft 54 through a drive gear 52, connected to parts turret drive shaft 49, and an output gear 53 connected to ring turret drive shaft 54. There is a one-to-one relationship between drive gear 52 and output gear 53 such that ring turret drive shaft 54 is rotated in a manner identical to the rotation of parts turret drive shaft 49. Ring turret drive shaft 54 is carried in a cylindrical housing 55 which is mounted adjacent cylindrical housing 50, both being mounted on a table 59. Ring turret 20 is mounted directly on top of ring turret drive shaft 54.

It is important that the rotation of ring turret 20 and parts turret 30 through 90° segments be very carefully controlled such that one does not rotate 89° while the other rotates 90°. One factor which could interfere with this control would be sloppiness between drive gear 52 and output gear 53. To insure that such sloppiness does not result, a drag assembly 56 is operably connected to ring turret 20 and, accordingly, to ring turret drive shaft 54 to insure that the teeth of output gear 53 are always held tightly against the teeth of drive gear 52. Drag assembly 56 includes a mounting 57 which is secured to cylindrical housing 55. A spring steel plate 58 is secured and extends upwardly from mounting 57. Mounted on top of spring steel plate 58 is a fiberglass brake shoe 58a which engages a downwardly depending portion of ring turret 20. This downwardly depending portion has been designated as brake drum 21. Thus, brake shoe 58a applies a constant drag on brake drum 21 and accordingly on ring drive shaft 54.

As a result of the arrangement of components in turret drive 40, motor 41 will be operating at all times. As long as brake clutch 43 is engaged, the cylindrical cam 46 of indexing drive 45 will constantly be rotating. However, due to the nature of such indexing drive systems, vertical output shaft 48 will be caused to rotate first through 90° and then to dwell, without rotating, for a period of time. This rotation is transmitted to ring turret 20 and parts turret 30 such that they repeatedly rotate through 90° and then dwell. It is during this dewll time that assembly operations are performed at the various work stations spaced circumferentially about ring turret 20 and parts turret 30.

In the event of some type of jam, torque limiter 51 signals clutch 43 to disengage. This allows motor 41 to continue operating without causing damage to the rest of the drive train.

Finally, a constant tension is maintained between drive gear 52 and output gear 53 by means of a drag assembly 56 which acts upon ring turret 20 and accordingly on ring turret drive shaft 54.

RING HOLDER

The function of the ring holder 60 (FIGS. 2 and 5) is to hold ring 18 in appropriate fixed position during transport and assembly. Ring 18 must be held with a predetermined distance across its gap in order to facilitate assembly with latch 12 and lock tabs 15. Thus, ring holder 60 includes magnets 63 for holding ring 18, gapper arrowhead 64 for maintaining an appropriate distance across the gap of ring 18, and locators 75 for holding ring 18 during assembly (FIG. 5).

Figure 5:
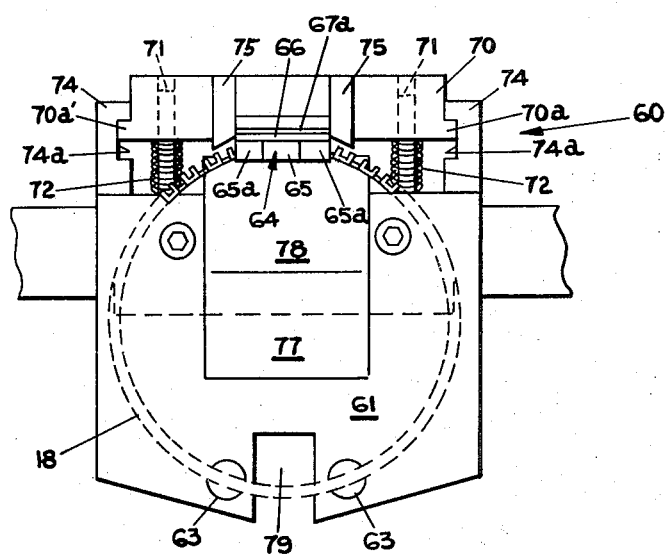
FIG. 5 is a front elevational view of the ring holder.
Figure 6:
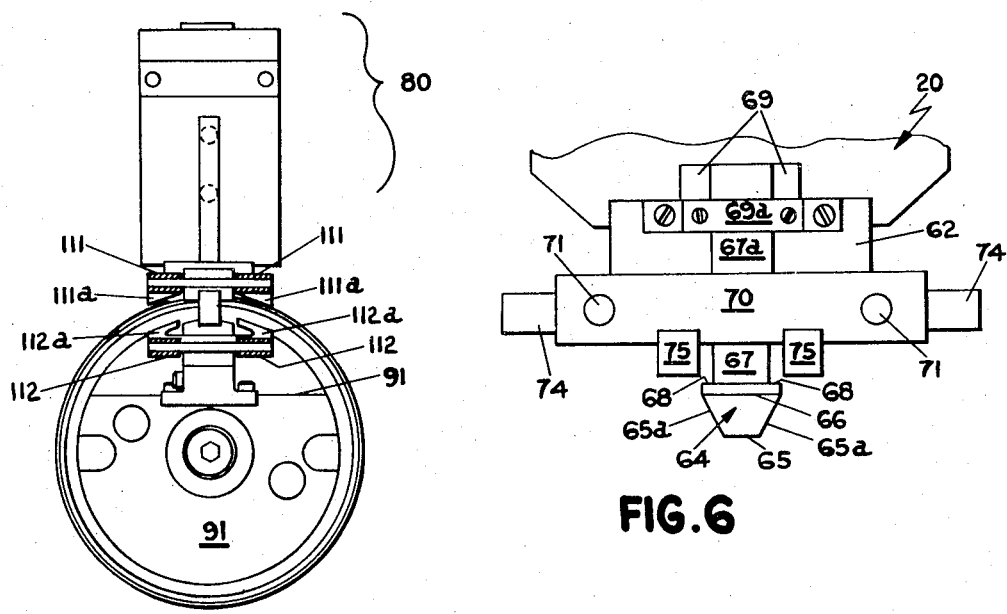
FIG. 6 is a plan view of the ring holder.

Magnets 63 are mounted in a holder plate 61 (FIG. 5) which is secured to a mounting block 62 (FIG. 6). Mounting block 62 is then securely mounted on ring turret 20.

Arrowhead gapper 64 is shaped like an arrowhead, as is indicated by its name (FIG. 6). Slanting rearwardly and outwardly from its blunt nose 65 are slanted sides 65a. These sides then become parallel and jut inwardly to shaft 67 to define a catch 68 at either side of shaft 67. The slanted sides 65a allow the ends of ring 18 to slide rearwardly over the catches 68 and into abutment with either side of shaft 67.

Arrowhead 64 includes a ridge 66, spaced rearwardly from nose 65 and extending across the top of arrowhead 64 (FIGS. 5 and 6). Ridge 66 cooperates with ring loader 80, in a manner which will be subsequently described, to facilitate transfer of a ring 18 from a ring loader 80 onto ring holder 60.

When a latch is assembled into ring 18 at the assembly station, i.e., at work station 3, arrowhead 64 would be in the way if it were rigidly fixed. Accordingly, shaft 67 of arrowhead 64 is connected to a hinge plate 67a (FIG. 6) which in turn is hingedly mounted at hinge 69. Hinge 69 is itself secured to the top of ring turret 20. Thus, when a latch 12 is inserted across the gap in ring 18, it forces arrowhead 64 to pivot upwardly about hinge 69. A hinge stop 69a (FIG. 6) limits the extent to which arrowhead 64 can be pivoted.

Locators 75 help hold ring 18 in position when assembly is effectuated at work station 3. In order to achieve this, locators 75 are pushed downwardly into engagement with the top of ring 18 at the time of assembly (compare FIGS. 29 and 30).

Figure 32:
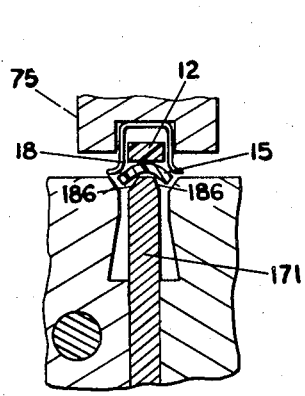
FIG. 32 is the same view as FIG. 31, with the pushers of the parts next being in an up position, pushing lock tab and latch into the ring.
Figure 31:
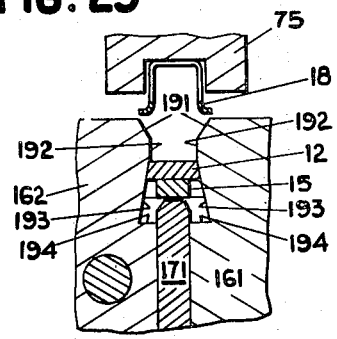
FIG. 31 is a fragmentary cross-sectinal view of the jaw area of the parts nest in position beneath the ring locators of the ring holder, in alignment at work station 3.
Figure 30:
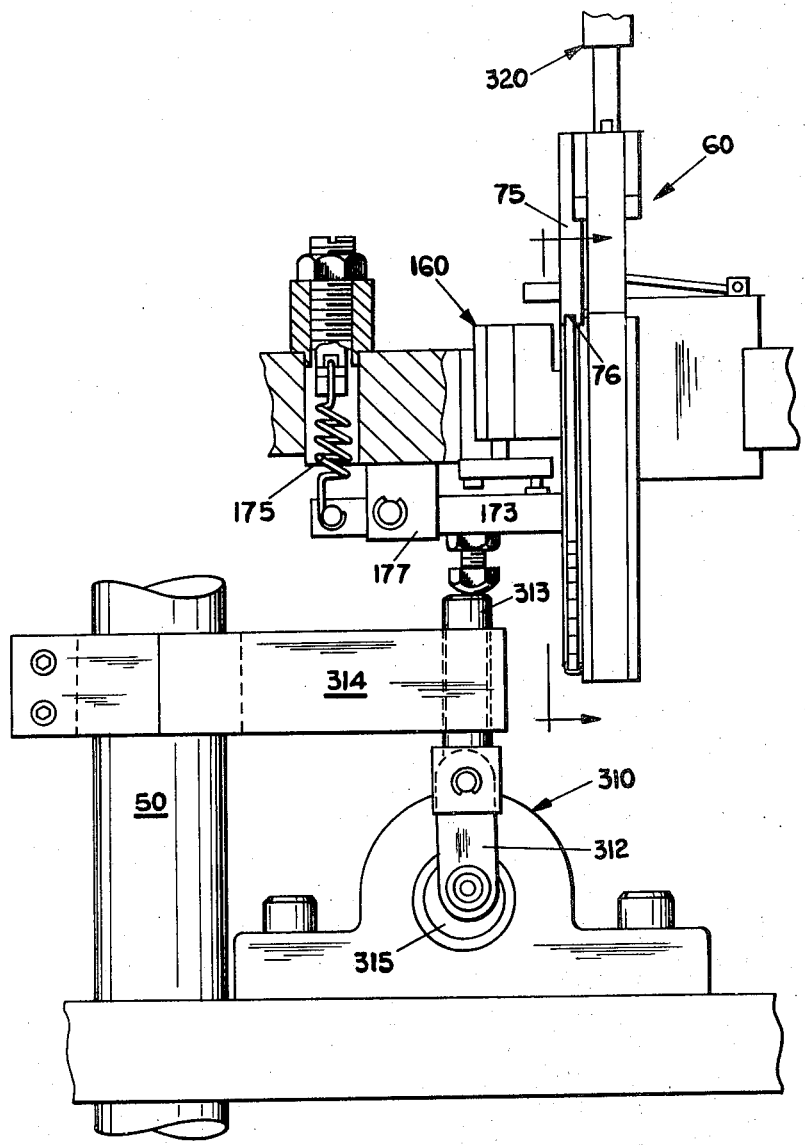
FIG. 30 is a side elevation of the assembly lifter in its up position.

Referring to FIGS. 30, 31 and 32, it can be seen that each locator 75 has a groove 76 therein whereby the top of ring 18 is actually embraced by each locator 75 when the locators 75 are pushed downwardly.

One locator 75 is positioned at either side of arrowhead 64 (FIG. 5). Both are mounted to a press block 70 which is slidably carried on a pair of spaced guide pins 71. A spring 72 is wrapped around each guide pin 71 to bias press block 70 to movement in an upward direction. The extent of movement of press block 70 in an upward and downward direction is limited by a stop 74 mounted at either side thereof. A pair of tabs 70a project laterally from each side of press block 70 into mating engagement with a notch 74a in each stop 74.

During assembly of the latched ring 11, ring holder 60 and parts nest 160 must not only be in alignment, but also parts nest 160 must be in a position beneath the gap in ring 18. Accordingly, the face of holder plate 61 is recessed to accommodate the front portions of parts nest 160 (FIG. 5). Recess 77 is a fairly shallow recess while recess 78 is somewhat deeper, actually allowing parts nest 160 to slip into position directly beneath the gap in ring 18.

Finally, plate 61 of ring holder 60 includes a clearance slot 79 in the bottom thereof extending a sufficient distance upwardly that a portion of ring 18 passes over the face of slot 79. This is to facilitate the cooperation of ring holder 60 with ring unloader 340. More specifically, slot 79 allows a kicker 341 to pass through holder plate 61, engage the bottom of ring 18 and knock it free of ring holder 60. Thus, ring holder 60 accepts rings 18 from ring loader 80, transports them to work station 3, maintains them in a fixed, predetermined gap, and holds them in position during assembly. Finally, it cooperates with ring unloader 340 to facilitate removal of the assembled ring 11.

RING LOADER

Ring loader 80 (FIGS. 7-11) stores and loads rings 18 onto ring holder 60. Rings 18 are stored on a vibrating, T-shaped ring feeder 81 (FIGS. 8 and 9) which feeds rings 18 to reciprocating load cylinder 90. Load cylinder 90 reciprocates rearwardly into engagement with ring feeder 81 and then forwardly into engagement with ring holder 60 (compare FIGS. 8 and 9). When load cylinder 90 is at its rear position, a gate assembly 110 is in a down position (FIG. 8) allowing load cylinder 90 to capture a single ring and carry it forwardly on its next forward movement while holding the remaining rings on ring feeder 81. While load cylinder 90 is on its forward cycle, gate assembly 110 goes up (FIG. 9) causing the rings to move one ring closer to the end of ring feeder 81.

Figure 7:
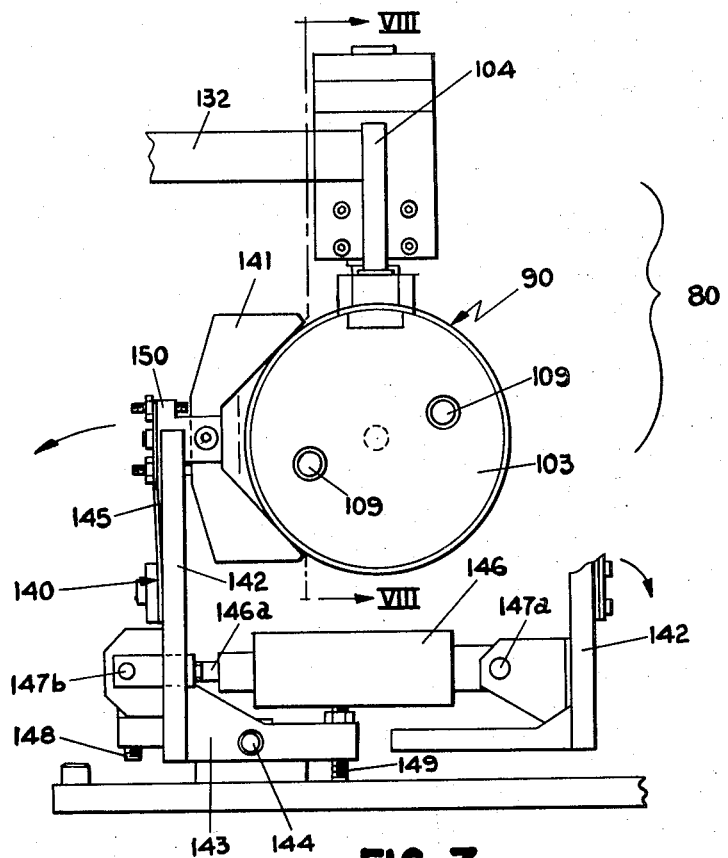
FIG. 7 is a front elevation of the ring loader.
Figure 9:
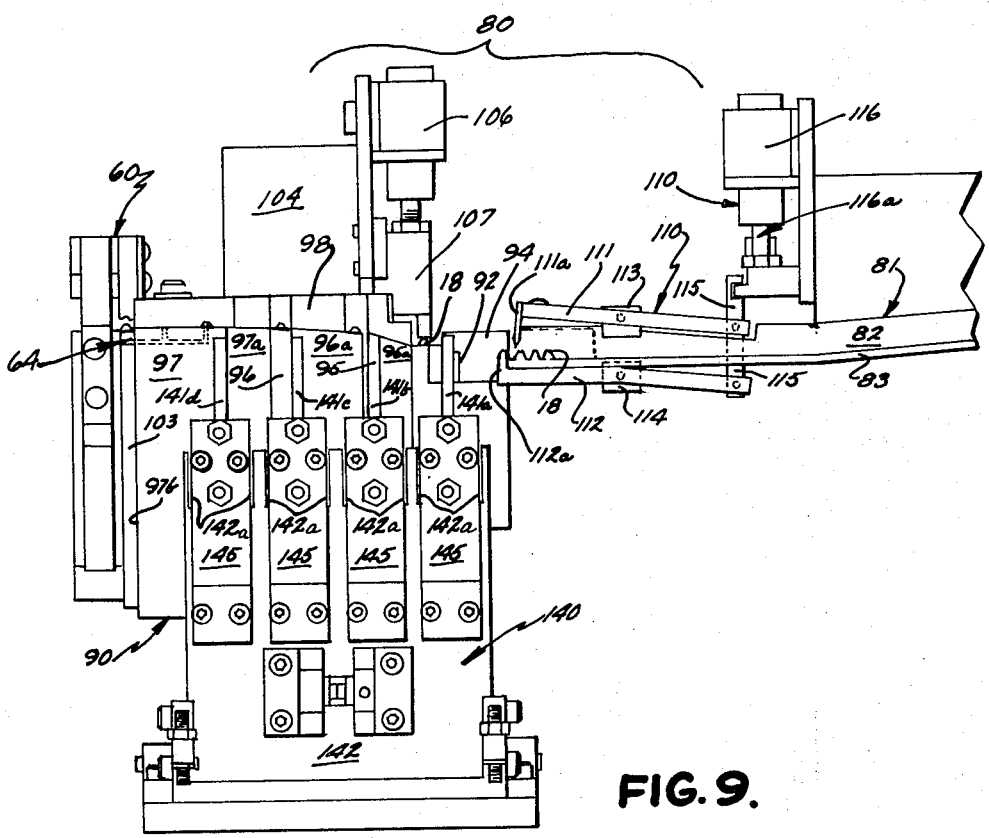
FIG. 9 is a side elevation of the ring loader showing it in its forward position.

As load cylinder 90 moves rearwardly, a finger assembly 140 on either side of load cylinder 90 moves inwardly with a plurality of fingers 141 to engage the previously loaded ring 18 and hold it in place while load cylinder 90 moves rearwardly (FIGS. 7 and 9). While there are fingers 141 on both sides of load cylinder 90, they are omitted from FIG. 7 on the right side of cylinder 90 for purposes of brevity. On the forward cycle, the finger assembly 140 pivots outwardly such that the fingers 141 do not engage load cylinder 90. In this manner, rings 18 are removed from ring feeder 81 and shifted forwardly along load cylinder 90 in step-wise progression until finally, they are positioned at the front of load cylinder 90 where they are picked up by ring holder 60.

Ring feeder 81 comprises an inverted, T-shaped bar having a T-fin 82 and a cross 83 at the bottom thereof (FIGS. 8 and 9). Cross 83 prevents the rings from falling off feeder 81, while T-fin 82 holds the ends of the ring apart, thereby maintaining a gap therein. Ring feeder 81 slopes generally downwardly towards load cylinder 90 and is operably connected to a vibrator 85 (FIG. 8) which, by vibrating ring feeder 81 causes rings 18 to slide downwardly towards load cylinder 90. Ring feeder 81 is supported by an overhead suspension bridge 86 (FIG. 2) which does not interfere with rings 18 hanging downwardly from ring feeder 81.

Figure 11:
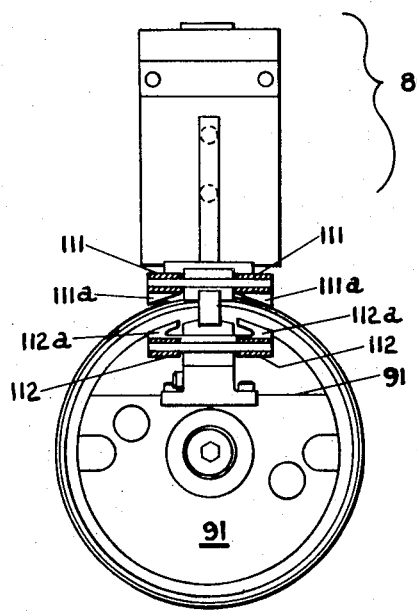
FIG. 11 is a cross-sectional view taken along plane XI—XI of FIG. 8.
Figure 10:
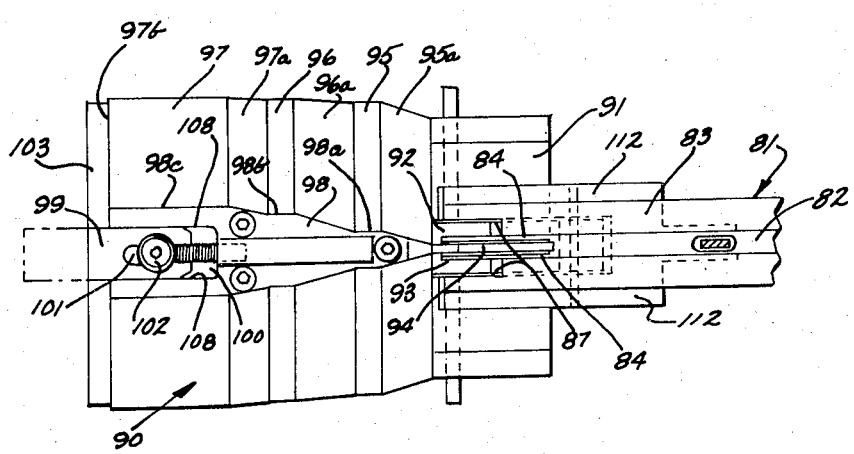
FIG. 10 is a plan view of the ring loader without its associated fingers.

Reciprocating load cylinder 90 includes a rear platform 91 at its rear which moves into mating engagement with feeder 81 when load cylinder 90 moves into its rearwardmost position (FIGS. 8 and 10). Mounted on top of platform 91 and projectin upwardly therefrom is a transfer hump 92 (FIGS. 8, 9 and 11). It is transfer hump 92 upon which a ring 18 rests when it is transferred from feeder 81 to load cylinder 90. There is a large slot 87 in cross 83 of feeder 81 which matingly embraces transfer hump 92 when load cylinder 90 is in its rearwardmost position (FIG. 10). Similarly, transfer hump 92 includes a slot 93 for receiving T-fin 82 of feeder 81. Finally, T-fin 82 is itself slotted at 84 so that it can matingly embrace a blade 94 mounted on platform 91 and projecting upwardly therefrom (FIGS. 10, 8 and 9). Because of this mating engagement, a ring 18 is readily vibrated along feeder 81 and then onto transfer hump 92. On feeder 81, the gap of ring 81 is maintained by T-fin 82. When transfer to hump 92 is effected and when load cylinder 90 is moved forwardly, the gap is maintained by blade 94.

In order to hold ring 18 in position on transfer hump 92 when load cylinder 90 is moved forwardly, a clamp 107 moves downwardly into engagement with the top of the ring 18 (compare FIGS. 8 and 9). Clamp 107 is controlled an air cylinder 106 which is mounted to a mounting fin 104 secured to load cylinder 90 (FIGS. 8 and 9).

To insure that rings 18 do not vibrate off the end of feeder 81 when load cylinder 90 is in its forward position, a gate assembly 110 is provided (FIGS. 8 and 9). Gate assembly 110 includes a top gate 111, a bottom gate 112 and a cylinder 116 for moving them upwardly and downwardly. Each gate 111 and 112 is split into two parts such that each embraces the centrally located transfer hump 92, T-fin 82 and blade 94 (FIGS. 11 and 10). Projecting downwardly from each half of top gate 111, at the end thereof is a ring-grasping prong 111a having a slanted edge whose slope corresponds to the curvature of a ring 18 (FIG. 11). Similarly, each half of bottom gate 112 includes an upwardly projecting ring-grasping prong 112a whose leading edge is also slanted to correspond to the curvature of a ring.

When load cylinder 90 begins to move forwardly, after transfer hump 92 clears the end of feeder 81, bottom gate 112 and top gate 111 are rotated into their up position by cylinder 116 (FIG. 9). Top gate 111 is hinged on T-fin 82 at hinge 113. Bottom gate 112 is hinged in vertical alignment therewith on cross 83 at hinge 114. The two gates 111 and 112 are joined together at their ends by a linkage member 115 which is operably connected to piston 116a of cylinder 116. In this manner, gates 111 and 112 move up and down simultaneously.

With bottom gate 112 in its upward position, its ring-grasping prong 112a extends above the level of cross 83 of feeder 81 and thereby prevents any rings from being vibrated off the end of feeder 81 (FIG. 9). However, the prongs 111a of gate 111 are raised out of the way of rings 18 as they move down feeder 81. Accordingly, they can slide right to the very end of feeder 81, into abutment with ring-grasping prong 112a.

Prong 111a of top gate 111 is spaced rearwardly of prong 112a a distance approximately equal to the thickness of a single ring 18. When load cylinder 90 moves rearwardly into engagement with feeder 81, both gates 111 and 112 pivot downwardly (FIG. 8) with the result that prong 112a is pivoted out of the way of the last ring on feeder 81 while prong 111a is pivoted downwardly into a position such that it blocks the passage of all of the rings on feeder 81, except for the last ring. The gates 111 and 112 must remain in this down position until load cylinder 90 has had an opportunity to begin moving forwardly with the last ring 18. Once this last ring 18 has been cleared of the end of feeder 81, the gates 111 and 112 again are pivoted to their up position as shown in FIG. 9.

Once a ring 18 has been captured by load cylinder 90, it is gradually moved forward thereon in a step-wise progression due to the cooperation of finger assembly 140 with load cylinder 90 when it is moving on its rearward cycle. Basically, the two sides of finger assembly 140 are pivoted outwardly away from load cylinder 90, in the manner indicated by the arrows in FIG. 7, when load cylinder 90 is moving in a forward direction. When load cylinder 90 first begins its rearward cycle, however, the fingers 141 are rotated into engagement with the sides of load cylinder 90 and consequently engage any rings 18 which are being carried on load cylinder 90. Thus for example, finger 141a (FIG. 9) engages the ring 18 which is positioned on transfer hump 92 and drags it forwardly, due to the fact that load cylinder 90 is moving rearwardly. The ring is dragged upwardly along an expanding diameter portion 95a of load cylinder 90 to a first step 95. Upon a subsequent rearward cycle, the same ring is dragged forwardly by finger 141b up an expanding diameter portion 96a to a second step 96. On still another rearward cycle, the ring is transferred by finger 141c up expanding diameter portion 97a to a third step 97. Finally, a fourth finger 141d drags the ring forwardly along third step 97, over the edge thereof and down to a telescoping sleeve 103 at the front end of load cylinder 90 (FIGS. 9 and 10).

Load cylinder 90 is actually generally cone-shaped. The gradually increasing diameter and circumference of load cylinder 90 as one proceeds from feeder 81 to the front end thereof, adjacent ring holder 60, serves the purpose of gradually expanding the distance across the ring gap such that when it is picked up by ring holder 60, its gap is sufficiently large that it allows the blunt end 65 (FIG. 6) of arrowhead 64 to pass therebetween. On the other hand, the gap must be sufficiently small that the ends of the ring must slide over a portion of the slanted surfaces 65a and will ultimately snap into position behind the catches 68 on arrowhead 64 (FIG. 6). Actually, the ring is expanded slightly larger when it is pushed onto third step 97 than it is when it is picked up by ring loader 60 off of telescoping sleeve 103. The purpose for this large expansion is to create a ledge 97b (FIGS. 9 and 10) at the end of third step 97 and dropping down towards telescoping sleeve 103. This ledge 97b prevents a ring from being pushed rearwardly back onto third step 97, as ring holder 60 engages load cylinder 90.

It should be noted that the gap in ring 18 cannot be maintained at any substantial distance when it is on feeder 81. If, for example, the width of T-fin 82 corresponded to the distance across the gap which is ultimately desired, the ends of the rings would be in considerably more tension against the sides of T-fin 82 than if T-fin 82 were relatively narrow. Accordingly, it would be more difficult for vibrator 85 to move the rings 18 along down the length of feeder 81. Thus, T-fin 82 is relatively narrow and an expansion of the desired gap distance is achieved through the increasing diameter and circumference of load cylinder 90.

In order to prevent rings 18 from sliding rearwardly as they progress along cylinder 90, the diameter of cylinder 90 expands in a step-wise fashion. Thus, load cylinder 90 expands at 95a until it reaches a first step 95, or plateau of a constant diameter. When a ring is transferred from transfer hump 92, it is first moved into position on this first step 95. Because step 95 is of a constant diameter, the ring will be maintained thereon and will not slide rearwardly. Similarly, an expanding portion 96a leads to a second step 96 of constant diameter and a third expanding portion 97a leads to the third step 97 of constant diameter.

In order to maintain and gradually increase the gap between the ends of ring 18, a step-wise expanding fin 98 projects upwardly from load cylinder 90 along the top thereof (FIGS. 8, 9 and 10). The breadth of this fin gradually expands in a step-wise fashion in the same manner as does the diameter of load cylinder 90. Thus, it also includes a first step 98a, a second step 98b, and a third step 98c (FIG. 10). Referring to FIG. 10, it can be seen that step 98c is of greater breadth than step 98b, 98b is of greater breadth than step 98a, and step 98a is of greater breadth than blade 94.

At the front of fin 98 there is a substantial slot 108 which matingly receives a telescoping fin 99. The purpose of fin 99 is to maintain a proper gap in ring 18 when it is pushed onto telescoping sleeve 103. Fin 99 telescopes inwardly in order to insure that it abuts against ridge 66 of arrowhead gapper 64 to insure a smooth transfer of a ring 18 off of sleeve 103, off of telescoping fin 99 and over the head of arrowhead 64 to a position behind catches 68. In order to effectuate telescoping, fin 99 includes a guide slot 101 passing vertically therethrough through which passes a guide pin 102 (FIG. 10). Guide pin 102 is then securely fixed to telescoping sleeve 103. Finally, spring 100 is positioned with one end in a recess in telescoping fin 99 and with its other end in a recess in step fin 98. Spring 100 biases telescoping fin 99 outwardly toward the front of cylinder 90.

Sleeve 103 similarly telescopes into and out of cylinder 90. It is mounted within a large circular recess in the end of cylinder 90 and has a diameter which is just slightly less than the diameter of third step 97 (FIG. 8). It slides inwardly and outwardly on a pair of horizontal guide pins 109 (FIG. 7) and is biased toward the front of cylinder 90 by spring 103a (FIG. 8). Outward movement of telescoping sleeve 103 is prevented by a bolt 104a which passes through the center of spring 103a and which is threaded into sleeve 103. The head of bolt 104a comes to rest against an internal wall 88 of cylinder 90 which separates the central cavity, in which telescoping sleeve 103 and spring 103a are positioned, from a rear access cavity 89 (FIG. 8).

Finger assembly 140 comprises a plurality of fingers 141 on each side of cylinder 90, operably connected to a pivoting hand plate 142 (FIG. 7). Hand plate 142 is secured to a mounting arm 143 which in turn pivots about a mounting arm hinge pin 144. Pivotal movement is achieved by the activation and deactivation of a cylinder 146 which is pivotally connected at 147a to right hand plate 142 and whose piston 146a is pivotally connected at 147b to left hand plate 142. Outward pivotal movement is limited by a stop 148 at the outer end of each arm 143 and inward movement is limited by a stop pin 149 at the inside end of each arm 143.

Figure 4:
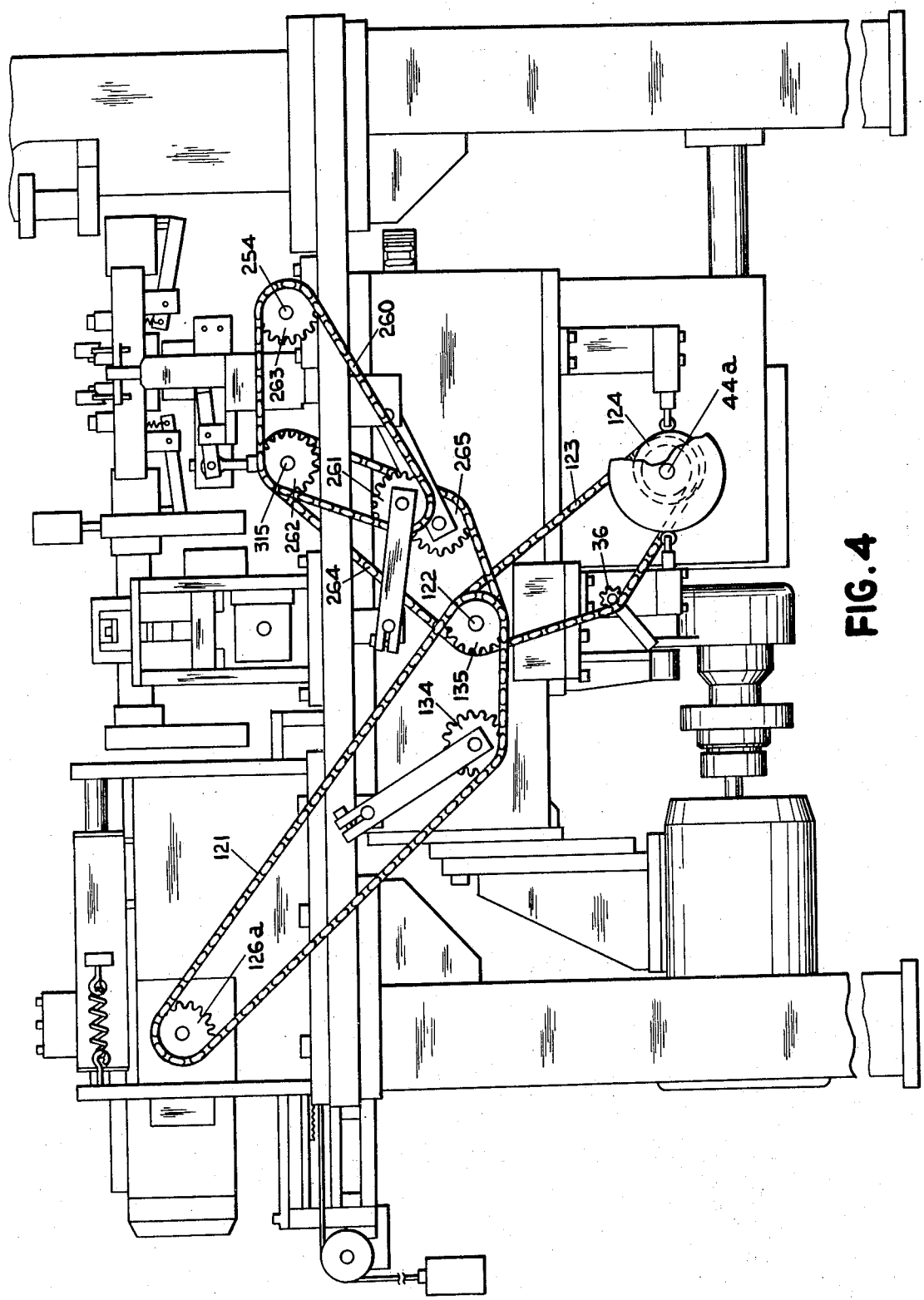
FIG. 4 is a front elevational view of the latch installation apparatus.

The activation and deactivation of cylinder 146 is controlled by a valve which in turn is controlled by a microswitch. The microswitch operates in response to a small cam on timer shaft 122 (FIG. 4). Timer shaft 122 is driven by output shaft 44a via drive chain 123. It will be recalled that a single rotation of output shaft 44a causes ring turret 20 and parts turret 30 to rotate through 90° and dwell. Since timer shaft 122 is driven by output shaft 44a in a direct rotational relationship, a single rotation of output shaft 44a will cause a single rotation of timer shaft 122. Thus by placing a cam on timer shaft 122 at an appropriate location, the microswitch which controls cylinder 146 can be positioned to do so in proper time relationship to the rotation and dwell cycle of ring turret 20 and parts turret 30.

When the fingers 141 are pivoted inwardly into engagement with load cylinder 90, it will be appreciated that as load cylinder 90 moves rearwardly, each finger 141 must have the capability of shifting outwardly as the diameter and circumference of load cylinder 90 increases. In other words, each finger 141 must be capable of sliding along an inclined or increasing diameter portion of load cylinder 90. This is accomplished by connecting each finger 141 to hand plate 142 through a knuckle spring 145, so called because it allows each finger 141 to pivot slightly with respect to hand plate 142 (FIG. 7). Knuckle spring 145 comprises a piece of flat spring steel with one end secured to hand plate 142 and with its other end secured to finger 141.

Each finger 141 is shaped in the side view so as to wrap around load cylinder 90 (FIG. 7). In this manner, each finger 141 contacts a ring 18 at the top portion and at the bottom portion thereof. Hand plate 142 includes four slots 142a at the top thereof for embracing each finger mount 150 (FIG. 7) and preventing the fingers 141 from shifting laterally (FIG. 9).

Thus, as each finger moves along an expanding diameter portion of load cylinder 90, knuckle spring 145 gradually flexes outwardly, allowing its respective finger 141 to move outwardly away from the central axis of load cylinder 90.

Figure 12:
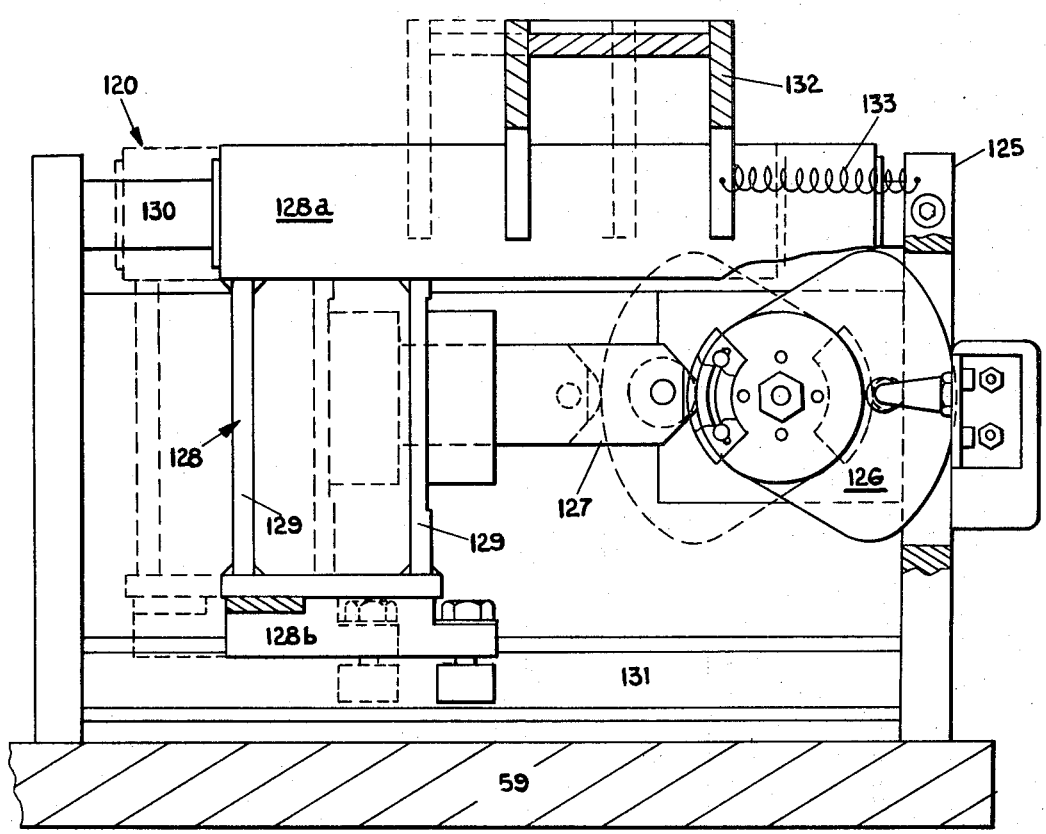
FIG. 12 is a cross section taken along plane XII—XII of FIG. 2, showing the drive system for ring loader.

The reciprocating motion of load cylinder 90 is achieved through a cylinder drive 120 (FIG. 12). A cam 126 is rotatably mounted in a housing 125 which in turn is rigidly secured to table 59. Cam 126 shares its axle with a sprocket 126a (FIG. 4) which is driven by a chain 121. Chain 121 in turn passes over a suitable idler gear 134 and over a gear 135 which is one of three gears mounted adjacent one another on a timer shaft 122. For purposes of driving cam 126, timer shaft 122 merely functions as a motion transmitter. A second sprocket mounted on timer shaft 122 provides the rotating force therefor via main drive chain 123 which passes over a suitable idler 136 and over a main drive gear 124 which is mounted on output shaft 44a. It will be recalled that output shaft 44a is that shaft leading from gear reducer 44 through indexing drive 45 and upon which cylindrical cam 46 is mounted.

Cam 126 acts against a follower 127 (FIG. 12) which is rigidly secured to a vertical wall 129 of a slide 128. Slide 128 includes a top portion 128a which slides on a top rail 130 and a bottom portion 128b which slides on a bottom rail 131. Top rail 130 and bottom rail 131 are mounted between the ends of housing 125.

A cylinder mounting arm 132 then extends outwardly from the top portion 128a of slide 128, and load cylinder 90 is mounted on the end of cylinder mounting arm 132 (FIGS. 2 and 7). More specifically, the end of cylinder mounting arm 132 is welded to mounting fin 104 which projects upwardly from stepped fin 98 (FIG. 7).

Finally, a large spring 133 extends between arm 132 and the right end wall, as viewed in FIG. 12, of housing 125. This biases the entire slide assembly 128 towards the right side of housing 125. Accordingly, as cam 126 is rotated, slide 128 and arm 132 will be reciprocated from right to left and back again along top rail 130 and bottom rail 131.

Thus, with a single rotation of output shaft 44a, ring turret 20 and parts turret 30 are rotated 90° and allowed to dwell momentarily. During this same single rotation, load cylinder 90 is cycled rearwardly and forwardly by cam 126 of cylinder drive 120. When load cylinder 90 is moved rearwardly, it moves into mating engagement with feeder 81. Gate assembly 110 rotates gate 111 and 112 to a downward position, thus allowing a single ring at the very end of feeder 81 to be clamped into position on transfer hump 92 of load cylinder 90 by clamp 107. Also on the rearward cycle of load cylinder 90, all of the rings on load cylinder 90 are transferred forwardly to the next step. The ring which was previously on third step 97 is transferred to telescoping sleeve 103. When load cylinder 90 moves forwardly, it moves into abutment with ring holder 60. Arrowhead gapper 64 pushes telescoping fin 99 rearwardly and pushes through the gap in a ring 18. The ring then snaps into position behind catches 68 on arrowhead gapper 64 and when load cylinder 90 again cycles rearwardly, the ring is held in position on ring holder 60 by means of magnets 63 and arrowhead gapper 64.

Finally, while load cyclinder 90 is in its forward position, gate assembly 110 causes gate 111 and 112 to be pivoted to their upward position, thus allowing another ring to move into position at the very end of ring feeder 81, but preventing any ring from vibrating off of the end of ring feeder 81.

PARTS NEST

Figure 14:
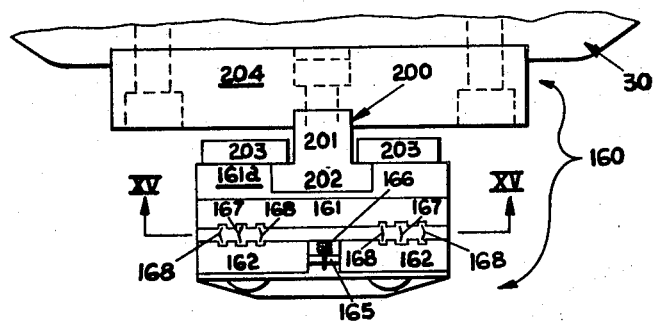
FIG. 14 is a plan view of the parts nest.
Figure 15:
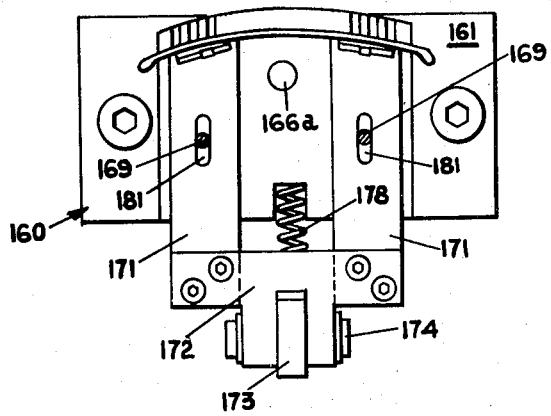
FIG. 15 is a cross section taken along plane XV—XV of FIG. 14, with a latch and lock tabs in place in the parts nest.
Figure 13:
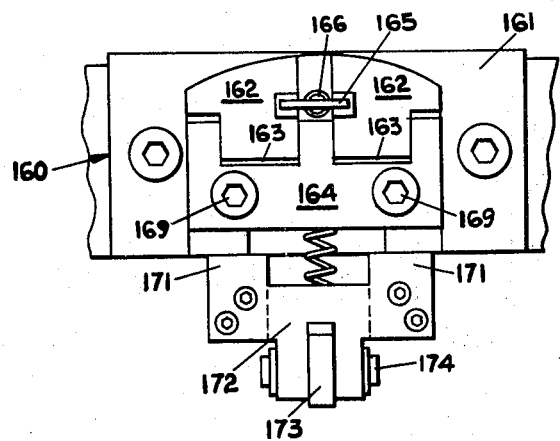
FIG. 13 is a front elevational view of the parts nest.

Latch 12 and lock tabs 15 are loaded into parts nest 160 (FIGS. 13-15). These parts are held in position between a face plate 161 and a pair of spaced hinge plates 162 (FIG. 14). Parts nest 160 is itself slidably mounted on a T-track 200 so that it can be moved upwardly into position beneath lock tab loader 220, latch loader 290 and up into position beneath ring holder 60 at assembly station 3.

Parts nest 160 is slidably mounted on parts turret 30 in order that it can be moved upwardly into engagement with ring holder 60 at assembly station 3 and with lock tab loader 220 and latch loader 290. A T-shaped track 200 having a leg 201 and a cross piece 202 is bolted to a track mount 204 which is in turn bolted to parts turret 30. Mounting plate 161a to which face plate 161 is secured includes a channel-shaped groove for embracing cross piece 202. A pair of keepers 203 at either side of leg 201 holds mounting plate 161a on cross piece 202.

Parts nest 160 also includes a pair of pushers 171 for pushing the parts up out of parts nest 160 and into engagement with ring 18 on ring holder 60 (FIG. 15). Pushers 171 also cooperate with lock tab loader 220 during the loading of lock tabs 15 onto parts nest 160.

Hinge plates 162 are hingedly mounted to face plate 161 via cover plate 164. Each hinge plate 162 is mounted to cover plate 164 at hinges 163 (FIG. 13). In turn, cover plate 164 is bolted to face plate 161. In this manner, they define a jaw, or actually a pair of independently opening jaws which slide up and down on T-track 200.

Each hinge plate 162 is independently hinged at 163 because each cooperates with face plate 161 to embrace a separate lock tab 15. The independent action of each hinge plate 162 insures proper grasping of each lock tab 15. Both hinge plates 162 are biased towards face plate 161 by means of spring 166 (FIG. 14). Spring 166 is secured at one end to a bar 165 which extends out over each hinge plate 162 (FIG. 13). Spring 166 then passes into and through an aperture 166a in face plate 161 (FIG. 15) and is secured to mounting plate 161a. Face plate 161 is also secured to mounting plate 161a.

Each hinge plate 162 includes a sloped wall 191 sloping downwardly and inwardly from its top edge (FIG. 31). An identical wall 191 is in an identical position across from hinge plate 162 on face plate 161. The purpose of these downwardly and inwardly sloping walls 191 is to define a wider opening at the top of parts nest 160 whereby lock tabs 15 and latch 12 can be gently guided into proper position between hinge plate 162 and face plate 161. The walls then become vertical at 192 and then cut back inwardly at 193. The purpose of each cutback wall 193 is to leave a narrow ridge 194 at the base of the jaw area of parts nest 160 in order to provide a resting place for the parts in the parts nest. As parts are moved into these jaw areas, the hinge plates 162 are forced outwardly, but then spring back inwardly to firmly grip the parts when in place.

Figure 39:
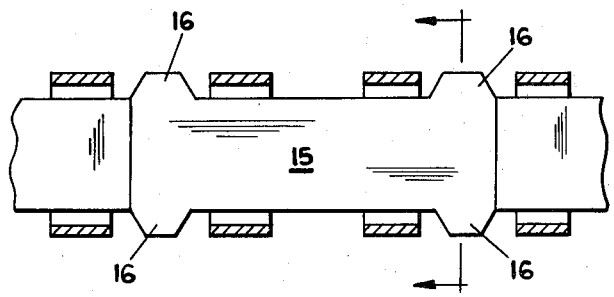
FIG. 39 is a sectional view taken along plane XXXIX—XXXIX of FIG. 38.

In order to accommodate the projecting end flanges 16 of each lock tab 15 (FIG. 39), the hinge plate 162 and face plate 161 have channel-shaped grooves in their opposing faces to define end flange guide channels 168 (FIG. 14). Because pushers 171 have a central pedestal 185 at their tops (FIGS. 16 and 17), the opposing faces of hinge plates 162 and face plate 161 also define a pair of pedestal guide channels 167, each positioned between the two end flange guide channels 168 at either side of parts nest 160 (FIG. 14).

Each pusher 171 includes a guide slot 181 therein (FIG. 15) which cooperates with a guide bolt 169 passing into face plate 161 to insure proper sliding movement of pushers 171. Guide bolts 169 are also the bolts which are used to fasten cover plate 164 to face plate 161.

Figure 29:
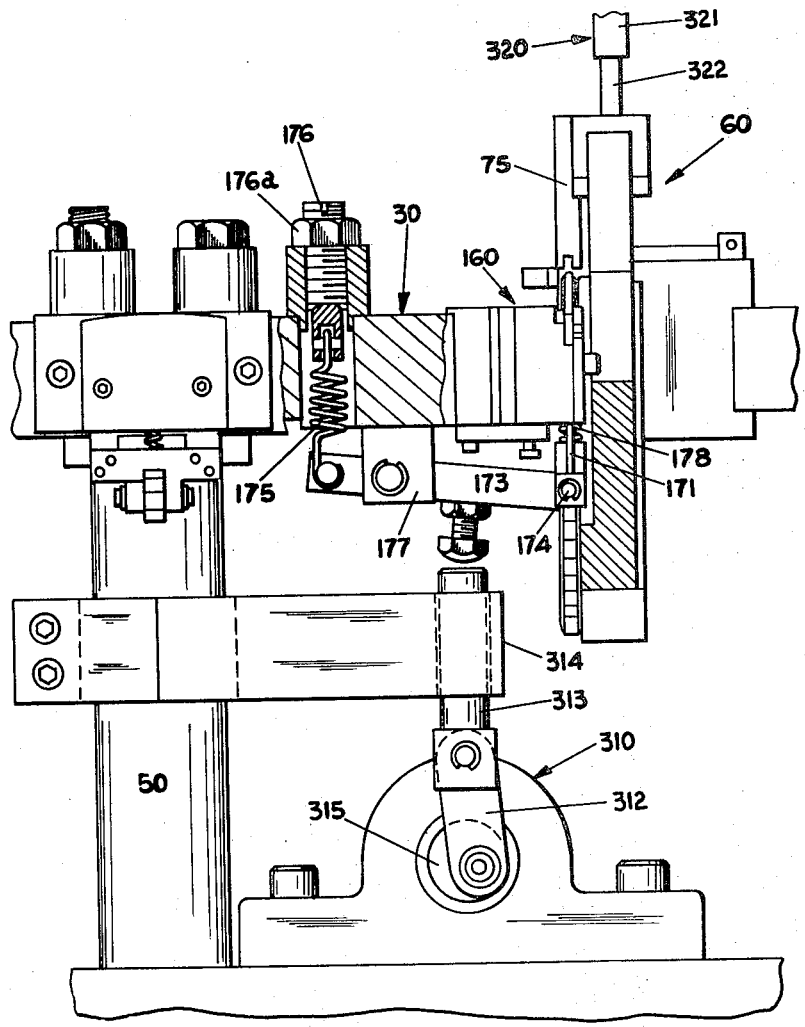
FIG. 29 is a side elevation of the assembly lifter in its down position.

The pushers 171 serve as a means for pushing the parts out of the parts nest, and also provide a resting surface for the parts as they are being loaded and when they are in position in the parts nest. There are a pair of pushers 171, each positioned at either side of parts nest 160 and corresponding to the desired assembly position for lock tabs 15 (FIGS. 13 and 14). Each pusher 171 is joined to a common mount 172 which is pivotally mounted at pivot 174 at the end of a rocker arm 173 (FIGS. 13 and 15). Rocker arm 173 is mounted on a central pivot assembly 177 which depends downwardly from parts turret 30 (FIG. 29). At its end opposite from pivot mount 174, rocker arm 173 is secured to a tension spring 175 which in turn is fastened at its other end to a tension adjustment bolt 176. Bolt 176 is threaded in a knot 176a on parts turret 30 and by threading bolt 176 upwardly or downwardly, the tension in tension spring 175 can be varied. As can be seen by comparing FIGS. 29 and 30, rocker arm 173 can be pivoted about pivot assembly 177, but is normally biased to a downward position as shown in FIG. 29 by means of tension spring 175. When rocker arm 173 is forced upwardly, pushers 171 will also be forced upwardly.

However, pushers 171 do not immediately move upwardly with respect to parts nest 160 when rocker arms 173 are activated. Rather, a compression spring 178 (FIGS. 15 and 29) is mounted between the top of common mount bracket 172, to which pushers 171 are secured, and the bottom of face plate 161. These biases pushers 171 to movement opposite face plate 161. The purpose of compression spring 178 is to insure that parts nest 160, particularly face plate 161 and the members rigidly secured thereto, move upwardly towards the locators 75 of ring holder 60 prior to any movement of pushers 171. This insures that parts nest 160 is in abutment with the base of a ring 18 on ring holder 60 before the pushers 171 push any parts out of nest 160. Thus, when rocker arm 173 is pushed upwardly, the compression of spring 178 causes the entire parts nest 160 to move upwardly before pushers 171 move upwardly with respect to face plate 161 and hinge plate 162. Once movement of the parts nest 160 is stopped by its abutting against a ring 18 on ring holder 60, pushers 171 then push on upwardly to thereby force lock tabs 15 and latch 12 out of parts nest 160 and into engagement with a ring 18 on ring holder 60.

Figure 17:
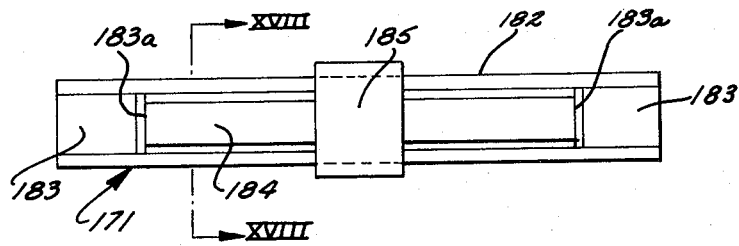
FIG. 17 is a plan view of the pusher.
Figure 18:
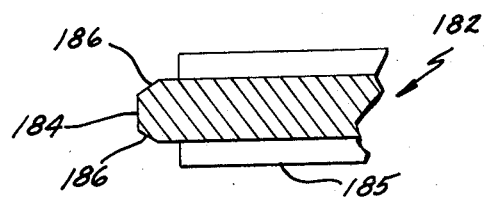
FIG. 18 is a cross section taken along plane XVIII—XVIII of FIG. 17.
Figure 16:
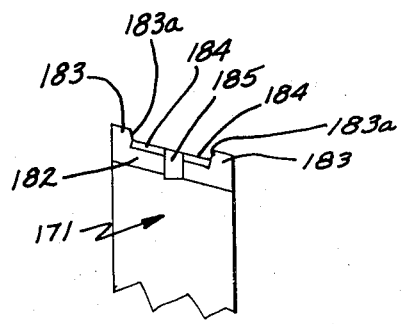
FIG. 16 is a front elevational view of the top portion of the pusher, which is an element of the parts nest assembly.

The tops 182 of pushers 171 are especially designed so that pushers 171 can also serve as a resting place for lock tabs 15 and latch 12 (FIGS. 16, 17 and 18). Each top 182 includes an end post 183 projecting upwardly at either end thereof (FIGS. 16 and 17). It is between these end posts 183 that a lock tab 15 is embraced. The lock tab 15 rests on a flat plateau 184 which extends between end posts 183 and which is broken by a central pedestal 185. It should be noted that each end post 183 is beveled slightly at 183a to define a wider opening at their tops. This insures that a lock tab 15 will slide properly into position between end posts 183. Central pedestal 185 is a flat pedestal which merely provides additional support for lock tab 15. It is positioned approximately at the same height as plateau 184.

With lock tabs 15 in place, latch 12 then rests on top of both pushers 171, specifically end posts 183, and on lock tabs 15 embraced thereby. In this regard, it is important that each end post 183 is approximately the same height as the thickness of lock tab 15.

Finally, it is important that plateau 184 be beveled slightly at each of its sides to define downwardly and outwardly sloping sides 186 (FIG. 18). These sloped walls 186 are important in facilitating the insertion of lock tab 15 and latch 12 into ring 18. Referring to FIG. 31, it will be seen that a lock tab 15 and a latch 12 are in position atop a pusher 171 directly beneath a ring 18 which is positioned within the groove of a ring locator 75. FIG. 31 shows the positions of these components just as assembly is beginning with the pusher 171 pushing the parts out of the parts next 160. FIG. 32 shows the components a moment later with latch 12 having been pushed upwardly to a position within the channel defined by ring 18 and with lock tab 1t just entering ring 18. Note how the sloped walls or beveled edges 186 on pusher 171 allow lock tab 15 to bend over the top of plateau 184 and thereby allow the end flanges 16 of lock tabs 15 to pass upwardly into ring 18 and then snap outwardly into position within the locking frames 19 of ring 18.

Thus, hinge plates 162 and face plate 161 of parts nest 160 define an opening and closing jaw for receiving and holding lock tabs 15 and latch 12. Pusher 171 functions as a resting place for those parts and as a means for pushing those parts up out of parts nest 160. Parts nest 160 is itself slidably mounted on parts turret 30 and when assembly is to be effectuated at assembly station 3, the activation of rocker arm 173 first results in parts nest 160 being slid upwardly into position between ring locators 75. Once parts nest 160 can go no further, rocker arm 173 then carries pushers 171 upwardly to push the parts out of parts nest 160 and into engagement with ring 18.

LOCK TAB LOADER AND LOADING LIFTER ASSEMBLY

Figure 19:
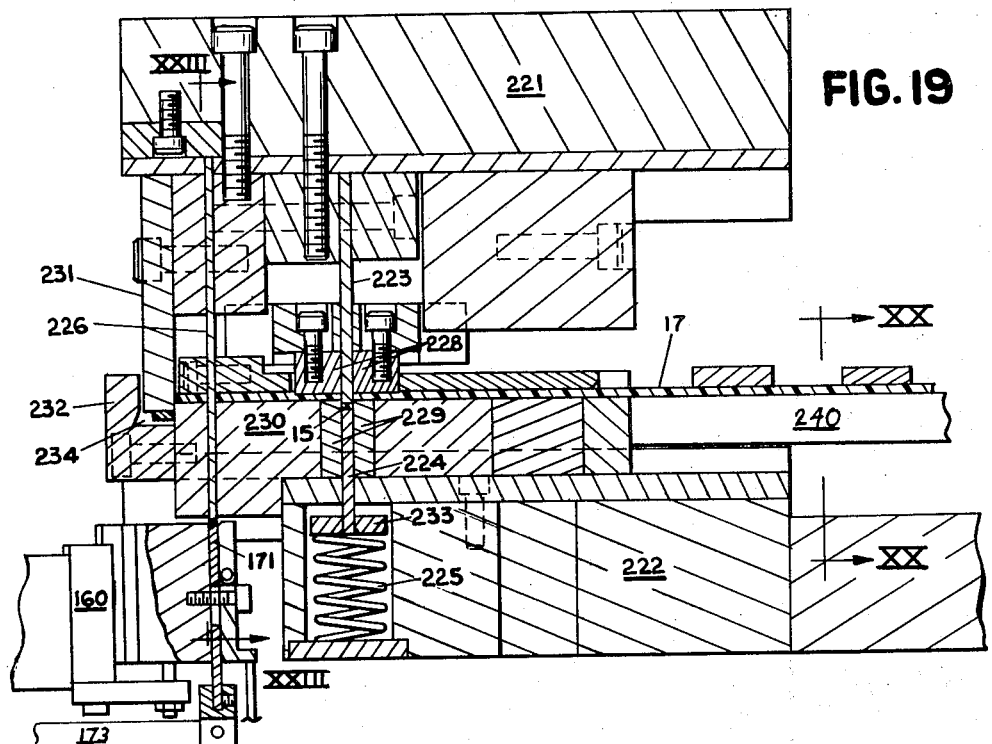
FIG. 19 is a cross section taken along plane XIX—XIX of FIG. 2, showing the lock tab loader.

Lock tab loader 220 punches lock tabs 15 out of a web of plastic 17 which is fed into lock tab loader 220 by web feeder 240 (FIG. 19). Because lock tabs 15 are so small, they are extremely difficult to control and it is not practically feasible to simultaneously punch lock tabs 15 out of webs 17 and insert them into parts nests 160. Accordingly, lock tabs 15 are first punched from web 17 by a prepunch 223 (FIG. 19), immediately returned to the web by a return punch 224, and finally transported to the front of lock tab loader 220 as part of web 17. Then, they are finally pushed down out of web 17 and into parts nest 160 by loader punch 226.

As loader punch 226 moves downwardly, it is met by pushers 171 coming upwardly. Thus, a lock tab 15 is sandwiched between loader punch 226 and pusher 171. Accordingly, the elevation of parts nest 160 into position beneath lock tab loader 220, and the elevation of pusher 171 during loading of lock tab 15 is an extremely important part of the loading operation. This raising is achieved by means of a loading lifter assembly 250 (FIG. 24).

The various punches referred to above are carried on an upper frame 221 and a bottom frame 220 which are joined together by some conventional means (FIG. 19). Mounted on top of upper frame 221 is some type of conventional punch drive mechanism. When the punch cycle is effectuated, upper frame 221 and its related punches are driven downwardly and then returned upwardly to complete the cycle.

As with the control of the inward and outward movement of fingers 141 of ring loader 80, the punch drive mechanism for driving frame 221 downwardly and recycling it upwardly is controlled by a microswitch activated by a cam mounted on timer shaft 122 (FIG. 4). This enables the punch cycle to be properly timed with respect to the rotation and dwell cycle of ring turret 20 and parts turret 30.

Prepunch 223 is guided in punch guide 228. Positioned directly beneath prepunch 223 is return punch 224. It is springbiased upwardly by spring 225 positioned within a recess in bottom frame 222. It is carried in a bottom guide or die 229. As prepunch 223 comes down through punch guide 228, it punches out a lock tab 15 and pushes downwardly against upwardly biased return punch 224. As prepunch 223 retracts upwardly, spring 225 forces return punch 224 upwardly and thereby forces lock tab 15 right back into the aperture in web 17 from whence it came. The base 233 of return punch 224 acts as a stop to prevent return punch 224 from punching lock tab 15 on up and out of web 17.

Web 17 then carries the punched out and returned lock tab 15 forwardly to a position beneath load punch 226. When the punch cycle is activated, loader punch 226 moves downwardly forcing lock tab 15 down through guide passageway 230 and into parts nest 160. Guide passageway 230 and loader punch 226 have approximately the same cross-sectional configuration as lock tab 15, to thereby positively control the movement of lock tab 15.

Figure 20:
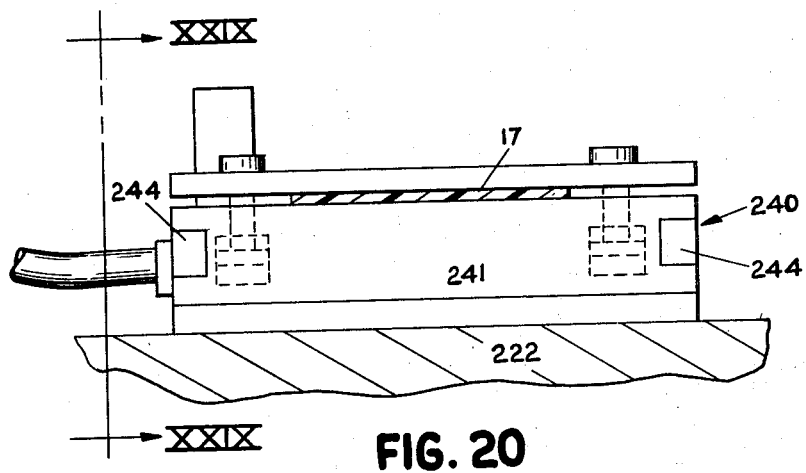
FIG. 20 is a cross section taken along plane XX—XX of FIG. 19, showing the plastic web stock feeder.
Figure 21:
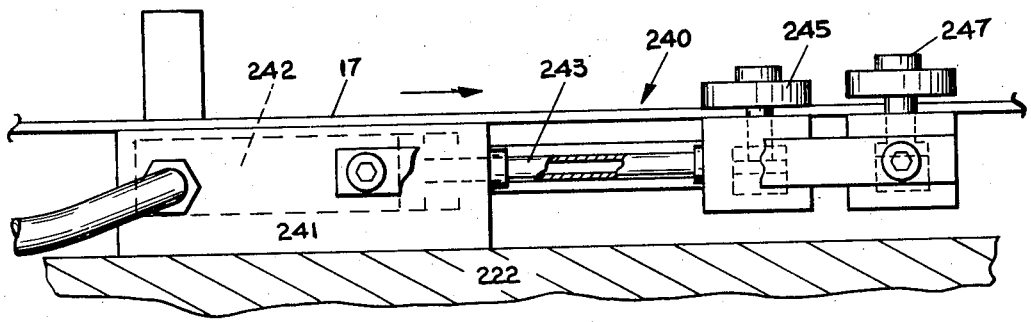
FIG. 21 is a side view of the web stock feeder in its feed cycle.
Figure 22:
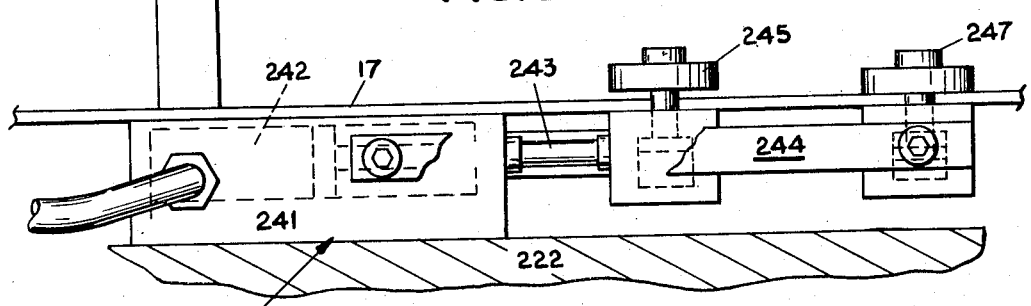
FIG. 22 is a side view of the web stock feeder in its retract cycle.

Web 17 is fed into lock tab loader 220 by means of a conventional reciprocating web feeder 240 (FIGS. 20, 21 & 22). A cylinder 242 is mounted in a block 241 which is firmly mounted on bottom frame 222 of loader 220. A moving clamp 245 is slidably mounted between two rails 244, one mounted at either side of block 241 (FIG. 20) ending forwardly therefrom. Moving clamp 245 is connected to the end of piston 243 of cylinder 242. As clamp 245 begins to slide forwardly, it clamps down tight on web 17 in the manner shown in FIG. 21. When piston 243 reaches the end of its stroke, clamp 245 lets go of web 17 as shown in FIG. 22, and a holding clamp 247 clamps down. Holding clamp 247 is mounted to the ends of rails 244 and is not slidable thereon. After clamp 245 has been returned to its initial position, clamp 247 lets go of web 17, thus allowing web 17 to be moved forwardly again when it is reclamped by moving clamp 245.

Cylinder 242 of web feeder 240 is controlled by a microswitch activated by a cam mounted on timer shaft 122 (FIG. 4). As with the control of the punch drive mechanism and of the fingers 141, this enables web feeder 240 to be activated in proper sequence with respect to the rotation and dwell cycle of ring turret 20 and parts turret 30.

Positive control over this reciprocating motion is insured by a stop 232 which is mounted on the front of lock tab loader 220 and which projects upwardly into the path of web 17 (FIG. 19). Also positioned at the front of lock tab loader 220 is a scrap shear 231 which is connected to upper frame 221 along with prepunch 223 and loader punch 226 (FIG. 19). On the punch cycle, scrap shear 231 serves to shear off any web scrap from the rest of web 17 and leave it laying in a scrap channel 234 from whence it is whisked away by a blast of air or other conventional removal means.

Figure 23:
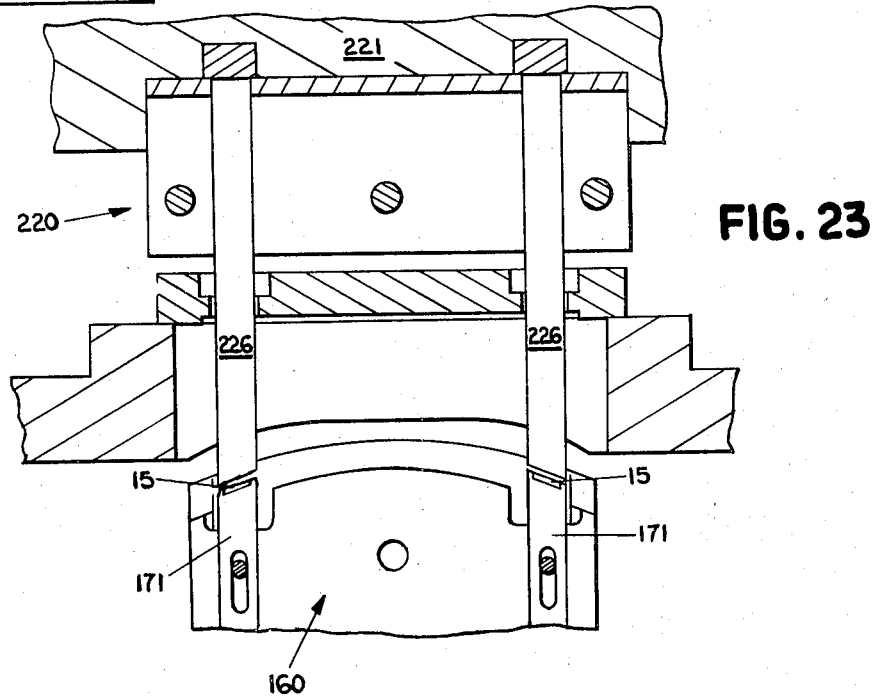
FIG. 23 is a cross section taken along plane XXIII—XXIII of FIG. 19, showing the pushers meeting the lock tab punch.

When loader punch 226 is activated, it is very important that parts nest 160 be directly in position beneath lock tab loader 220 and that pushers 171 be extended to an upward position for meeting load punch 226 just as it leaves guide passageway 230. This facilitates a capture of lock tab 15 between pusher 171 and load punch 226 (FIG. 23). Thus, the loading lifter assembly 250 which effectuates these operations is a very important part of the overall loading assembly.

Loader lifter assembly 250 provides the lifting motion both at lock tab loader 220 and at latch loader 290. It comprises an elongated bar 251 having a lock tab pedestal 252 located at one end and a latch pedestal 253 located at the other end (FIGS. 24 and 25). Loader lifter assembly 250 is driven up and down in a reciprocating motion by a rotating drive shaft 254 having a cam 255 on the end thereof (FIG. 26). Bar 251 is then connected to a follower 256 which is reciprocated up and down by cam 255.

Lock tab pedestal 252 is detailed in FIG. 27. It includes first a nest lifter 271 which contacts parts nest 160 directly and thereby lifts it upwardly into position beneath lock tab loader 220 without ever contacting rocker arm 173 (FIG. 24). This is important because parts nest 160 must be held firmly in place during the loading of lock tab 15 while pushers 171 must be free to pivot downwardly. Thus, if nest lifter 271 were eliminated and if the raising of parts nest 160 were accomplished by the application of lifting force to rocker arm 173, the action of loading punch 226 in pushers 171 downwardly would also tend to push parts nest 160 downwardly. This would result in the possibility of losing lock tabs 15 entirely.

Lock tab pedestal 252 also includes a pusher lifter 277 (FIG. 27). It is considerably shorter than nest lifter 271 in order to insure that parts nest 160 is firmly in position beneath lock tab loader 220 before pushers 171 are activated. Nest lifter 271 is mounted on a base 272 which is spring-loaded by spring 273. Thus, once parts nest 160 is home, bar 251 can still continue to move upwardly because of the compression of spring 273. Base 272 is guided in its up and down motion within lock tab pedestal 252 by means of a guide pin 274 engaging a slot 275. Movement of base 272 out of lock tab pedestal 252 is prevented by a pair of stop tabs 276 projecting laterally from the base thereof.

Pusher lifter 277 is also carried on a compression spring 278 in order that loader punch 226 will be free to force pushers 171 downwardly to thereby effectuate a seating of lock tab 15 in position between hinge plates 162 and face plate 161. Spring 278 is less resistant to flex than spring 273 since spring 273 must hold parts nest 160 in position against the downward movement of loader punch 226 while spring 278 must allow loader punch 226 to force lifters 171 downwardly.

Rotation of drive shaft 254 is achieved by interconnection with output shaft 44a. This is also the shaft which drives cam 126 of cylinder drive 120. The drive train includes a chain 260 which is carried on a gear 263 which is mounted on drive shaft 254. It also passes over a gear 262 on assembly drive shaft 315, whose function will be hereafter discussed. Finally, it is carried on an idler gear 261. A drive transfer chain 264 is carried on a second gear mounted on assembly drive shaft 315, over an idler gear 265 and over another gear mounted on timer shaft 122. Thus, single rotation of output shaft 44a effectuates rotation of parts turret 30 to a new station, allows it to dwell at that station, and effectuates a cycling of loader lifter assembly 250.

LATCH LOADER

Latch loader 290 (FIG. 28) is similar in principle and operation to lock tab loader 220, except that it is somewhat simpler in operation due to the less complicated requirements for handling the larger part, i.e., latch 12. Latch 12 is punched from a plastic web 14 which is fed into latch loader 290 by latch web feeder 291. Latch web feeder 192 is identical to web feeder 240 (FIGS. 20, 21 and 22). As web 14 is fed into latch loader 290, it eventually reaches a punch 295 mounted on top frame 293. Punch 295 is driven by a conventional punch drive 294. Punch 295 punches downwardly through a die 298, punches out a latch 12, forces it downwardly through a guide 296 and into parts nest 160. The scrap 14a is maintained sandwiched between die 298 and roller guide 296 and is thereby pushed out to scrap tunnel 297. Due to the nature of web 14, it is severed completely across its length when latch 12 is formed. Therefore, as scrap 14a reaches scrap tunnel 297, it falls into the path of scrap tunnel 297 and is drawn away by a vacuum.

Punch drive 295 and web feeder 291 are both controlled by microswitches activated by cams on timer shaft 122 (FIG. 4). This insures proper timing of these movements.

As with lock tab loader 220, the raising of parts next 160 into position beneath latch loader 290 is an important part of the loading operation. This is achieved by nest lifter 281 (FIG. 28) which is mounted on and projects upwardly from pedestal 253 at the end of bar 251 (FIGS. 24 and 25). Nest lifter 281 is spring-loaded in the same manner as nest lifter 271. It is not necessary to the loading of latch 12, that pushers 171 be forced upwardly to meet punch 295. Accordingly, pedestal 253 does not have a secondary lifter comparable to pusher lifter 277 of lock tab pedestal 252.

ASSEMBLY LIFTER AND ASSEMBLY PRESS

When a ring holder 60 and a parts nest 160 abut into alignment at work station 3, assembly of the latch 12 and lock tabs 15 into ring 18 is effectuated by assembly lifter 310 and assembly press 320 (FIGS. 29 and 30). Assembly lifter 310 lifts parts nest 160 upwardly into position directly beneath a ring 18 (compare FIGS. 29 and 30). Assembly press 320 pushes ring locators 75 downwardly into abutment with the top of a ring 18 (compare FIGS. 29 and 30). Once parts nest 160 is in place, assembly lifter 310 then carries pushers 171 on upwardly, forcing lock tabs 15 and latch 12 upwardly into engagement with the downwardly opening channel defined by ring 18 (compare FIGS. 31 and 32).

The actual lifting accomplished by assembly lifter 310 is achieved by a rod 313 mounted in a rod guide 314 (FIGS. 29 and 30). Rod guide 314 is mounted to housing 50 for vertical output shaft 48.

The reciprocating up and down movement of rod 313 is achieved by its pivotal connection to a linkage member 312 which is in turn eccentrically mounted to the end of assembly drive shaft 315. As has heretofore been described, assembly drive shaft 315 is driven by drive chain 264 and ultimately by output shaft 44a of gear reducer 44. Thus, the rotation of output shaft 44a through one cycle effectuates a 90° rotation of parts turret 30 and ring turret 20 and effectuates a cycling of assembly lifter 310.

Assembly press 320 comprises a cylinder 321 having a piston 322 extending downwardly therefrom for abutment against the top of press block 70 to which ring locators 75 are secured. The actuation of cylinder 321 is effectuated by a microswitch which is activated by a cam mounted on timer shaft 122. Since timer shaft 122 is ultimately driven by output shaft 44a, the activation of cylinder 321 is sequentially timed in with the cycling and pausing of ring turret 20 and parts turret 30. In operation, the activation of cylinder 321 is timed just ahead of upward movement of assembly lifter 310 to insure that ring 18 is firmly held when parts nest 160 moves into engagement therewith.

RING UNLOADER

Figure 34:
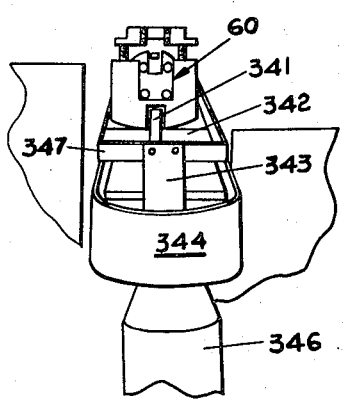
FIG. 34 is a front elevational view of the ring unloader.
Figure 35:
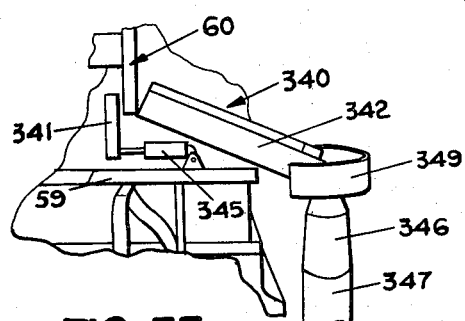
FIG. 35 is a side elevational view of the ring unloader.

Ring unloader 340 acts to remove an assembled ring 18, latch 12 and lock tab 15 from ring holder 60 at work station 4 (FIG. 1) and transfer the assembled ring to a cardboard ring tube 347 (FIG. 35). A kicker 341 actually moves forwardly from a position behind ring holder 60, through slot 79 in ring holder 60 (FIGS. 34 and 35). This knocks the assembled ring onto a trough-shaped chute 342. The assembled ring slides down the chute, off the end thereof and over the top of a cone 346 which is positioned atop cardboard ring tube 347.

Kicker 341 reciprocates fore-and-aft by the action of a cylinder 345 (FIG. 35). Cylinder 345 is actuated by a microswitch which in turn is actuated by a cam mounted on timer shaft 122. As has been previously noted, timer shaft 122 is driven by output shaft 44a such that the activation of kicker 341 can be appropriately timed with respect to the rotation and dwell time of ring turret 20.

As the assembled ring slides down the sloped chute 342, it is engaged by a flexible stabilizing tab 343. Stabilizing tab 343 is constructed of a flexible plastic or some other flexible material and is secured to a bracket 348 which extends across the top of chute 342. Stabilizing tab 343 is positioned near the end of chute 342 (FIGS. 33 and 34) such that it insures that the assembled ring will be laying flat as it slides off the end of chute 342 onto cone 346. A guard 344 extends outwardly from the end of chute 342 in a semicircular fashion to insure that none of the assembled rings overshoot cone 346.

Once the rings are on cone 346, the weight of succeeding rings gradually forces them down off of cone 346 and onto a cardboard tube 347. Once a tube 347 has been filled, cone 346 is removed and the loaded tube 347 is packaged for shipment.

CLEARING ASSEMBLY

As has heretofore been pointed out, the purpose of clearing assembly 380 is to clear any latch 12 and/or lock tabs 15 from a parts nest 160 in the event of an aborted assembly at work station 3. Clearing assembly 380 is located at work station 7 adjacent parts turret 30 (FIG. 1 and 2).

Figure 37:
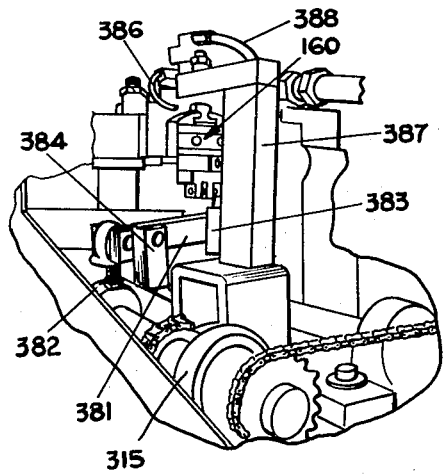
FIG. 37 is a generally side perspective view of the parts clearing assembly.
Figure 36:
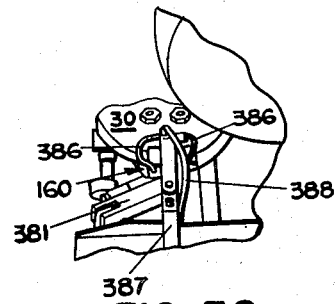
FIG. 36 is an elevated perspective view of the parts clearing assembly.

Clearing assembly 380 includes a clearing lifter 381 which acts to force pushers 171 upwardly and air tubes 386 which act to blow the parts thus exposed out of parts nest 160, (FIGS. 36 and 37). Clearing lifter 381 comprises a rod which is pivotally mounted at 384 and which is actuated at one end by a cam 382 mounted on assembly drive shaft 315. The opposite end of clearing lifter 381 includes a pedestal 383 for directly contacting rocker arm 173 of parts nest assembly 160 to thereby force pushers 171 upwardly (FIG. 37).

Once the parts in parts nest 160 are thus exposed, a blast of air is directed through air tubes 386 which are pointed towards either side of the top of parts nest 160, approximately in line with the tops of pushers 171. Air tubes 386 are joined at a main air supply tube 388 and are mounted on a tower 387 which in turn is mounted to table 59 (FIGS. 36 and 37).

The timing of the blast of air is controlled by a valve which is actuated by a microswitch, which in turn is actuated by a cam on timing shaft 122. Since timing shaft 122 is driven by output shaft 44a, the blast of air can be timed to occur in proper relationship with respect to the rotation and pause of parts turret 30.

OPERATION

Turning now to the general operation of the apparatus, attention is directed to the ring holder 60 and parts nest 160 located initially at work stations 1 and 5 respectively. At work station 1, a ring 18 without latch 12 or lock tabs 15 will vibrate down ring feeder 81 and will be captured by load cylinder 90 at the rearwardmost point in its path of reciprocating motion (FIG. 8). As load cylinder 90 continues to reciprocate, ring 18 will gradually move forwardly on cylinder 90 and will be expanded due to the generally increasing cone-shaped configuration of load cylinder 90. Ring 18 will be dragged forwardly by being engaged by fingers 141 which move into engagement with rings 18 as load cylinder 90 moves rearwardly. Eventually, a ring 18 becomes positioned on telescoping sleeve 103 and when load cylinder 90 moves to its forwardmost position, it engages ring holder 60, with telescoping fin 99 being forced to telescope inwardly (FIG. 9). Ring 1 then slips over the head of gapper 64 and is held in position on ring holder 60 by magnets 63.

Simultaneously, a pair of lock tabs 15 are loaded into parts nest 160 at work station 5. The prepunched lock tabs 15 are driven out of web 17 by loader punch 226 (FIG. 19). As lock tabs 15 are driven downwardly through guide passageway 230, pushers 171 are forced upwardly, first in conjunction with parts nest 160 and then with respect thereto, by loading lifter 250. The lock tabs 15 are then sandwiched into position between loader punches 226 and pushers 171. Pushers 171 and lock tabs 15 are then driven downwardly into position within parts nest 160 and the entire parts nest 160 is then allowed to retract away from lock tab loader 220 with lock tabs 15 being properly held in position on top of pushers 171.

With these two operations performed, the ring turret 20 and parts turret 30 then rotate simultaneously through 90° until the aforesaid ring holder 60 and parts nest 160 are positioned at work stations 2 and 6, respectively. The rotation through 90° is positively maintained by indexing drive 45 (FIG. 3). Positive control is further insured by the action of drag 56 against shaft 54 of ring turret 20.

Figure 28:
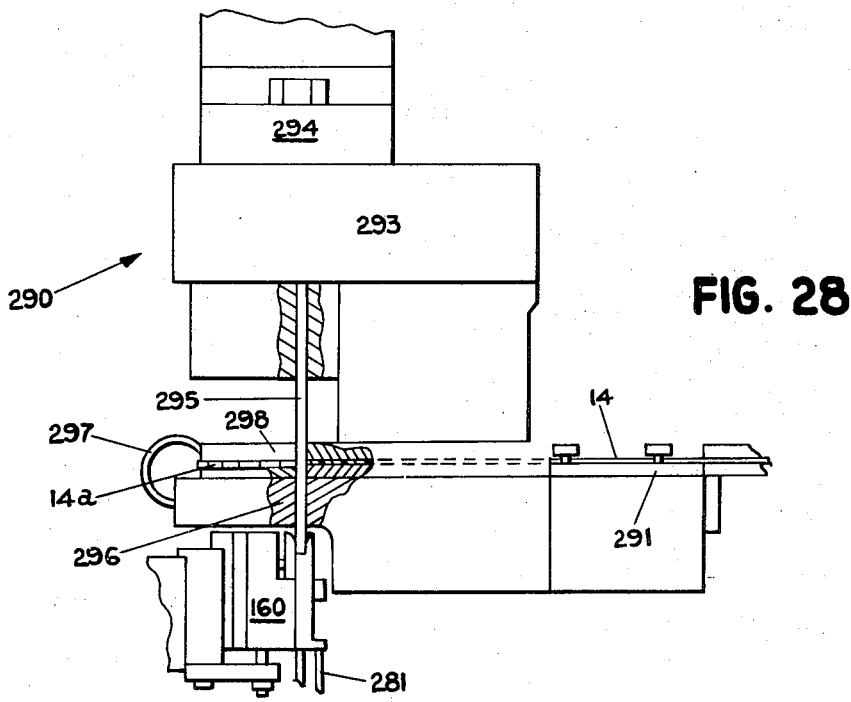
FIG. 28 is a side elevation of the latch loader.

At work station 2, no operation is performed. However at work station 6, a latch 12 is punched from a plastic web 14 and is forced downwardly into parts nest 160 by a punch 295 (FIG. 28). Parts nest 160 is driven upwardly into position beneath latch loader 290 by loader lifter 250. At this point, a latch 12 is positioned above a pair of lock tabs 15, near each end of latch 12, and all of these parts are maintained in position within parts nest 160 by being held between face plate 161 and hinge plates 162.

With this operation performed, ring turret 20 and parts turret 30 are then again rotated through 90° bringing parts nest 160 and ring holder 60 into alignment at work station 3 (FIGS. 29 and 30). Assembly lifter 310 lifts parts nest 160 uppwardly into position directly beneath a ring 18 being held on ring holder 60. Simultaneously, assembly press 320 pushes ring locators 75 downwardly into abutment with the top of a ring 18. Assembly lifter 310 then carries pushers 171 on upwardly, forcing lock tabs 15 and latch 12 upwardly into engagement with the downwardly opening channel defined by ring 18.

Figure 33:
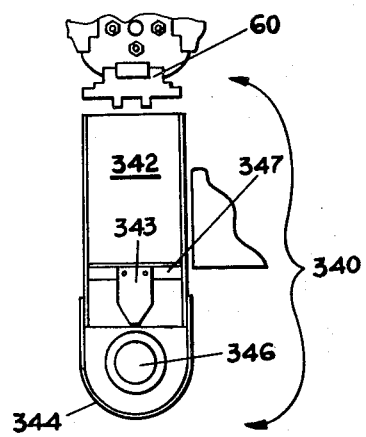
FIG. 33 is a plan view of the ring unloader.

With assembly thus completed, ring turret 20 and parts turret 30 are again rotated through 90° until the aforementioned ring holder 50 and parts nest 160 are positioned at work stations 4 and 7, respectively. At work station 4, kicker 341 of ring unloader 340 kicks an assembled ring free of ring holder 60 and onto chute 342 (FIGS. 33-35). The ring slides down chute 342 and over cone 346 onto a ring holding tube 347 on which assembled rings are shipped.

At work station 7, a clearing operation is performed on parts nest 160 just in case the assembly operation performed at work station 3 has gone awry (FIGS. 36 and 37). Clearing lifter 381 forces pushers 171 upwardly, thus exposing any lock tabs 15 or latch 12 which may be positioned thereon. Air tubes 386 are then activated to direct a short blast of air in the general direction of pushers 171 to thereby blow any loose parts away from parts nest 160.

Thus it can be seen that the various aspects of this invention act in combination to provide an entirely automatic apparatus for assembling a latch across the gapped ends of a split ring. Of course, it is understood that the above is merely a preferred embodiment of the invention and that many changes and alterations could be made thereof without departing from the spirit or broader aspects.

The embodiments of the invention in which an exclusive property or privilege is claimed are defined as follows:

1. A latch installation apparatus for installing a latch between the ends of a split ring, said apparatus comprising: means for holding a ring; means for loading a ring onto said ring holding means; means for holding a latch; means for loading a latch onto said latch holding means; means for aligning said latch holding means and said ring holding means; means for forcing said latch into engagement with said ring.

2. The apparatus of claim 1 in which said ring holding means includes: a ring holder plate, means for retaining a split ring against said holder plate and a gapper projecting outwardly from said holder plate for maintaining a gap between the ends of said split ring.

3. The apparatus of claim 2 in which: said gapper is hingedly mounted with respect to said holder plate whereby when said latch is forced into engagement with the ends of said ring, said gapper pivots upwardly out of the way of said latch.

4. The apparatus of claim 1 in which: said ring holding means includes means holding said ring with its ends in a predetermined position; an outwardly opening recess in said ring holding means oriented centrally of a ring being held on said ring holding means whereby said latch holding means can be moved into mating engagement with said ring holding means in a position with its latch within the circle defined by said ring and within the plane of said ring in alignment with said ends of said ring; said forcing means acting in a direction within the plane of said ring to force said latch into engagement with said ring when said latch holding means and said ring holding means are in mating engagement.

5. The apparatus of claim 4 in which said ring holding means comprises: a holder plate; means for holding said ring against said holder plate; said means for holding said ends of said ring in a predetermined position including a gapper projecting outwardly from said holder plate for holding the gapped ends of said ring in a fixed spaced relationship; said gapper having a generally arrowhead shape with sides sloping outwardly and towards said holder plate to facilitate a smooth transfer of said ring from said ring loading means to said ring holding means.

6. The apparatus of claim 5 which includes: a pusher slidably mounted in said latch holding means; said forcing means acting on said pusher to move said pusher towards said gapped ends of said ring and thereby force said latch into engagement with said ring; said ring holding means including a locator slidably mounted thereon for slidable movement into engagement with the gapped ends of said ring, to the outside of the circle defined by said ring; means for moving said locator into engagement with said ring just prior to the activation of said lifter means whereby said ring is firmly held in position when said latch is engaged into said ring.

7. The apparatus of claim 4 in which: said latch holding means comprises a hinge plate hingedly mounted to a face plate to define a jaw; a spring biasing said hinge plate to movement towards said face plate; said hinge plate having an inside surface spaced from the surface of said face plate a distance less than the width of one of said latches whereby said hinge plate acts to expand slightly as a latch is loaded thereinto and acts to hold said latch firmly in place between said hinge plate and said face plate.

8. The apparatus of claim 7 which includes: a pusher slidably mounted on said latch holding means; said pusher being at least partially positioned between said hinge plate and said face plate whereby said pusher acts as a resting surface for said latch when it is held in position between said hinge plate and said face plate; said forcing means acting on said pusher to move said pusher towards the ends of said ring and thereby force said latch into said ring.

9. The apparatus of claim 1 in which: said latch holding means includes a face plate; a hinge plate hingedly mounted thereto whereby said face plate and said hinge plate define a jaw; means biasing said hinge plate towards said face plate; a pusher slidably mounted in said latch holding means and being positioned between said face plate and said hinge plate; said forcing means acting on said pusher to push a latch out of said latch holder and into engagement with the ends of said ring.

10. The apparatus of claim 9 in which: said face plate is slidably mounted on a track member whereby said face plate and said hinge plate can be moved upwardly into a position immediately beneath said split ring prior to upward movement of said pusher with respect to said face plate and hinge plate.

11. The apparatus of claim 10 in which said pusher extends below said face plate and is pivotally connected to a rocker arm; said rocker arm being pivotally connected to said track member; bias means between the pusher end of said rocker arm and said face plate whereby said pusher and said face plate are biased to movement away from one another such that the application of a force to the base of the rocker arm near said pusher end thereof causes said face plate and said pusher to move upwardly simultaneously until said latch holding means contacts said ring, and then causes said pusher to move upwardly with respect to said face plate and hinge plate to push said latch out of said jaw defined thereby and into engagement with said ring.

12. The apparatus of claim 1 which comprises: means for loading lock tabs onto said latch holding means, ahead of the loading of said latch onto said latch holding means; said forcing means forcing said lock tabs into engagement with said ring, behind said latch, whereby said latch is locked into position in said ring.

13. The apparatus of claim 12 in which: said latch holding means includes a face plate; a pair of hinge plates hingedly joined to said face plate; each of said hinge plates being individually biased to movement towards said face plate whereby each of said hinge plates is capable of holding one of said lock tabs against said face plate; said hinge plates being so positioned with respect to one another that each is capable of holding one end of a latch extending therebetween; a pusher extending upwardly between each of said hinge plates and said face plate, each of said pushers being slidably mounted on said latch holding means and being joined together for simultaneous movement; said forcing means acting on said joined pushers to force said lock tabs and said latch upwardly out of said latch holding means and into engagement with a ring.

14. The apparatus of claim 12 in which said means for loading lock tabs onto said latch holding means comprises: a first pair of spaced punches for punching lock tabs out of an advancing web of plastic material; a pair of return punches positioned directly below said first punches and being biased to upward movement whereby said lock tabs, after being punched out by said first punches, are returned to said plastic web by said return punches when said first punches retract from said plastic web; means for advancing said plastic web; a pair of loading punches positioned ahead of said first punches and said return punches for driving said lock tabs out of said plastic web in which they are carried and for carrying them downwardly into said latch holding means.

15. The apparatus of claim 14 which comprises: a reciprocating lifter positioned beneath said lock tab loading means a sufficient distance to allow said latch holding means to be moved into position between said lifter and said lock tab loading means; said lifter acting on said pushers to move them upwardly towards said latch loading means as said loading punches are driven downward;y said pushers and said loading punches being sufficiently long and having sufficient travel to meet and hold said lock tabs therebetween; said lifter including a resilient portion allowing said loading punches to drive said lock tabs and said pushers downwardly into position between said hinge plates and said face plate; said lifter retracting from engagement with said pushers as said loading punches return upwardly, thereby leaving said lock tabs positioned atop said pushers between said hinge plates and said face plate.

16. The apparatus of claim 15 in which: said lifter comprises a base; a plate lifter projecting upwardly from said base for operably contacting said face plate; a pusher lifter projecting upwardly from said base for operably contacting said pusher; each of said plate lifter and said pusher lifter including a resilient portion; said resilient portion of said plate lifter being more resistant to flex then said resilient portion of said pusher whereby the downward force of said loading punch forces said pushers downwardly without forcing said face plate and hinge plates downwardly.

17. The apparatus of claim 1 in which said means for loading a latch onto said latch loading means includes a punch for punching a latch from a web of plastic and for driving said latch downwardly into said latch holding means; means for advancing said web of plastic to said punch.

18. The apparatus of claim 1 which comprises: means for extracting a ring from said ring holding means following assembly of said latch into said ring; a downwardly sloping chute for receiving said ring when extracted from said ring holding means; a cone-shaped member positioned at the end of said chute for receiving said rings coming off of said chute; said cone-shaped member being positioned atop a tubular member onto which said rings slide under the weight of succeeding rings gathering on said cone.

19. The apparatus of claim 12 which comprises: means for clearing parts such as latches and lock tabs, out of said latch holding means in the event of an aborted assembly into a ring, said clearing means including means forcing said parts out of said latch holding means and means applying a sharp blast of air to said latch holding means for blowing said parts away from said latch holding means.

20. The apparatus of claim 2 in which said ring loading means comprises: means for expanding the gap between the ends of a ring until it is approximately the same as or greater than the width of said gapper; means for moving said expanded ring into engagement with said gapper and with said means for retaining said ring against said holder plate.

21. The apparatus of claim 20 which comprises; said gapper having the general configuration of an arrowhead, having sides sloping away from a nose, towards said holder plate whereby the ends of a ring being loaded onto said ring holding means are gradually expnded by said gapper as said ring is slipped over the end thereof; said outwardly sloping sides each joining a wall jutting inwardly to a rearwardly extending shaft, said inwardly jutting walls thereby defining ridges for preventing a ring which has been slipped over said arrowhead of said gapper from slipping back off of said gapper.

22. An apparatus for assembling a latch between the ends of a split ring, said ring including means for receiving said latch, said apparatus comprising: means for holding a ring and means for holding a latch; said ring holding means including a holder plate, means for retaining a ring against said holder plate and a gapper projecting outwardly from said holder plate for maintaining a gap between the ends of said ring; said latch holding means including means for forcing said latch out of said latch holding means and into engagement with the ends of said ring across said gap which is maintained by said gapper.

23. The apparatus of claim 22 comprising: means for loading a ring onto said ring holding means; said gapper having the general configuration of an arrowhead, having sides sloping away from a nose, towards said holder plate, whereby the ends of a ring being loaded onto said ring holding means are gradually expanded by said gapper as said ring is slipped over the end thereof; said outwardly sloping sides each joining a wall jutting inwardly to a rearwardly extending shaft, said inwardly jutting walls thereby defining ridges for preventing a ring which has been slipped over said arrowhead of said gapper from slipping back off of said gapper.

24. The apparatus of claim 22 in which said gapper is hingedly mounted with respect to said holder plate whereby when said latch is forced into engagement with the ends of said ring, said gapper pivots upwardly out of the way of said latch.

25. The apparatus of claim 24 in which said ring holding means includes; locators slidably mounted with respect to said holder plate, in alignment with the ends of said ring on either side of said gapper; means for moving said locators into engagement with the exterior surfaces of said ring ends prior to the movement of said latch into engagement with said ring ends whereby said ring ends will be held in a fixed position when said forcing means forces said latch into engagement with said ring ends.

26. The apparatus of claim 22 in which said ring holding means includes: locators slidably mounted with respect to said holder plate, in alignment with the ends of said ring on either side of said gapper; means for moving said locators into engagement with the exterior surfaces of said ring ends prior to the forcing of said latch into engagement with said ring ends whereby said ring ends will be held in a fixed position when said forcing means forces said latch into engagement with said ring ends.

27. The apparatus of claim 22 in which said ring holding means includes: a recess in said holder plate located on the interior of the circle defined by said ring whereby said latch holding means matingly engages said holder plate in said recess and is thereby positioned in direct alignment with the ends of said ring, to the interior of the circle defined by said ring.

28. The apparatus of claim 22 which includes: means for unloading a ring from said ring holding means; said holder plate of said ring holding means having dimensions greater than the diameter of the circle defined by said ring; said holder plate having a slot therein passing through the width of said holder plate in alignment with a portion of a ring being held thereon; said ring unloading means including a kicker having dimensions smaller than the dimensions of said slot and means for moving said kicker through said slot to thereby knock said ring off of said holder plate.

29. The apparatus of claim 22 in which said means to retaining a ring against said holder plate comprises magnets embedded in said holder plate.

30. The apparatus of claim 29 which includes: means for unloading a ring from said ring holding means; said holder plate of said ring holding means having dimensions greater than the diameter of the circle defined by said ring; said holder plate having a slot therin passing through the width of said holder plate in alignment with a portion of a ring being held thereon; said ring unloading means including a kicker having dimensions smaller than the dimensions of said slot and means for moving said kicker through said slot to thereby knock said ring off of said holder plate.

31. The apparatus of claim 30 in which said means for unloading a ring from said ring holding means comprises: a chute positioned in alignment with said kicker for capturing said rings as they are knocked off said holder plate; a flexible tab being positioned above said chute and extending downwardly to said chute for insuring that rings sliding down said chute lay flat on said chute; a cone positioned at the end of said chute onto which said rings slide off of the end of said chute; a guard extending outwardly from the end of said chute for preventing rings from sliding past said cone and falling onto the floor.

32. A latch installation apparatus for installing a latch across the ends of a split ring said apparatus comprising: means for holding a latch; means for holding a split ring with its ends positioned above said latch holding means; said latch holding means including a face plate with a hinge plate hingedly mounted thereto whereby said face plate and said hinge plate defined a hinged jaw for holding a latch therein; means biasing said hinge plate towards said face plate; a pusher slidably mounted in said latch holding means and being positioned between said face plate and said hinge plate whereby an upward force can be applied to said pusher to push a latch out of said jaw and into engagement with the ends of said ring positioned above said latch holding means.

33. The apparatus of claim 32 in which: said face plate is slidably mounted on a track member whereby said face plate can be moved upwardly into a position immediately beneath said ends of said ring prior to upward movement of said pusher with respect to said face plate.

34. The apparatus of claim 33 in which said pusher extends below said face plate and is pivotally connected to a rocker arm; said rocker arm being pivotally connected to said track member; bias means between the pusher end of said rocker arm and said face plate whereby said pusher and said face plate are biased to movement away from one another such that the application of a force to the base of the rocker arm near said pusher end thereof causes said face plate and said pusher to move upwardly simultaneously until said face plate contacts said ring, and then causes said pusher to move upwardly with respect to said face plate to push said latch out of said face plate and hinge plate and into engagement with said ring.

35. A latch installation apparatus for installing a latch across the ends of the split ring, and for installing a pair of lock tabs, one at each of said split ends for hplding said latch in place within said split ring, said apparatus comprising: means for holding a latch and said lock tabs; means for holding a split ring with its ends positioned in alignment with said latch and lock tab holding means; said latch and lock tab holding means including a face plate and a pair of hinge plates hingedly joined to said face plate; each of said hinge plates being individually biased to movement towards said face plate whereby each of said hinge plates is capable of holding one of said lock tabs against said face plate; said hinge plates being so positioned with respect to one another that each is capable of holding one end of a latch extending between said hinge plates; a pusher extending upwardly between each of said hinge plates and said face plate, each of said pushers being slidably mounted on said latch and lock tab holding means and being joined together for simultaneous movement whereby a force can be applied to said pushers for pushing said lock tabs and said latch upwardly out of said latch and lock tab holding means and into engagement with a ring.

36. The apparatus of claim 35 in which the top edges of said pushers are beveled, thereby allowing said lock tabs to flex over the top of said pushers as they are pushed into engagement with said ring.

37. An apparatus for handling small plastic parts comprising: a parts nest for holding said parts; a parts loader for loading said parts into said parts nest; a punch mounted in said parts loader; said parts loader including means defining a passageway in alignment with said punch; said passageway and said punch having approximately the same cross-sectional configuration as that of said part; said parts loader including means for positioning one of said parts in alignment with said passageway and said punch at a point therebetween and means for moving said punch downwardly into said passageway; said parts holder including a pusher having a cross-sectional configuration corresponding approximately to that of said part, said pusher being aligned with said passageway at its end opposite the end at which said punch is located; said parts holder including means for moving said pusher upwardly to said passageway whereby a part pushed through said passageway is captured between said punch and said pusher; means on said parts holder allowing said pusher to be forced downwardly by said punch whereby said punch can drive said part and said pusher into said parts holder.

38. The apparatus of claim 37 in which said parts holder includes a hinged jaw flexibly biased to a closed position; said pusher being slidably positioned within said jaw.

* * * * *

UNITED STATES PATENT OFFICE
CERTIFICATE OF CORRECTION

Patent No. 3,825,988     Dated July 30, 1974

Inventor(s) Aldin Hardick; Delbert House; Alvin M. Martin

It is certified that error appears in the above-identified patent and that said Letters Patent are hereby corrected as shown below:

Col. 9, line 7;
   after "controlled" insert ---by---

Col. 15, line 48;
   after "tab" 1t should be ---15---

Col. 18, line 43;
   "192" should be ---291---

Col. 18, line 61;
   "next" should be ---nest---

Col. 21, line 1;
   "1" should be ---18---

Col. 27, line 19;
   "hplding" should be ---holding---

Signed and sealed this 17th day of December 1974.

(SEAL)
Attest:

McCOY M. GIBSON JR.
Attesting Officer

C. MARSHALL DANN
Commissioner of Patents